US010694146B2

(12) United States Patent
Lim et al.

(10) Patent No.: US 10,694,146 B2
(45) Date of Patent: *Jun. 23, 2020

(54) VIDEO CAPTURE SYSTEMS AND METHODS

(71) Applicant: MICROSOFT TECHNOLOGY LICENSING, LLC, Redmond, WA (US)

(72) Inventors: Se Hoon Lim, Bellevue, WA (US); Timothy Andrew Large, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/181,103

(22) Filed: Nov. 5, 2018

(65) Prior Publication Data
US 2019/0182453 A1 Jun. 13, 2019

Related U.S. Application Data

(63) Continuation of application No. 15/835,413, filed on Dec. 7, 2017, now Pat. No. 10,122,969.

(51) Int. Cl.
H04N 7/15 (2006.01)
H04N 7/14 (2006.01)
(Continued)

(52) U.S. Cl.
CPC ............ H04N 7/147 (2013.01); G06T 5/50 (2013.01); G06T 7/11 (2017.01); G06T 7/12 (2017.01);
(Continued)

(58) Field of Classification Search
CPC ...... H04N 7/15; H04N 7/152; H04N 5/23228; H04N 5/247; H04N 5/225
(Continued)

(56) References Cited

U.S. PATENT DOCUMENTS 8,509,545 B2 8/2013 Dedhia et al.
2005/0180656 A1 8/2005 Liu et al.
(Continued)

OTHER PUBLICATIONS

"International Search Report and Written Opinion Issued in PCT Application No. PCT/US18/048654", dated Jan. 18, 2019, 21 pages.
(Continued)

Primary Examiner — Melur Ramakrishnaiah
(74) Attorney, Agent, or Firm — NovoTechIP International PLLC

(57) ABSTRACT

Techniques for video capture including determining a position of a subject in relation to multiple cameras; selecting a foreground camera from the cameras based on at least the determined position; obtaining an RGB image captured by the foreground camera; segmenting the RGB image to identify a foreground portion corresponding to the subject, with a total height of the foreground portion being a first percentage of a total height of the RGB image; generating a foreground image from the foreground portion; producing a composite image, including compositing the foreground image and a background image to produce a portion of the composite image, with a total height of the foreground image in the composite image being a second percentage of a total height of the composite image and the second percentage being substantially less than the first percentage; and causing the composite image to be displayed on a remote system.

20 Claims, 21 Drawing Sheets

(51) Int. Cl.
*H04N 9/09* (2006.01)
*G06T 7/194* (2017.01)
*G06T 5/50* (2006.01)
*G06T 7/12* (2017.01)
*G06T 7/13* (2017.01)
*G06T 7/11* (2017.01)

(52) U.S. Cl.
CPC ............... *G06T 7/13* (2017.01); *G06T 7/194* (2017.01); *H04N 7/15* (2013.01); *H04N 9/09* (2013.01); *G06T 2207/10016* (2013.01); *G06T 2207/10024* (2013.01); *G06T 2207/10028* (2013.01); *G06T 2207/20221* (2013.01)

(58) Field of Classification Search
USPC ............. 348/14.01–14.16; 715/753; 709/204
See application file for complete search history.

(56) References Cited

U.S. PATENT DOCUMENTS

| | | |
|---|---|---|
| 2008/0181507 A1 | 7/2008 | Gope et al. |
| 2009/0232353 A1 | 9/2009 | Sundaresan et al. |
| 2010/0197390 A1 | 8/2010 | Craig et al. |
| 2012/0026277 A1* | 2/2012 | Malzbender ............ H04N 7/15 348/14.07 |
| 2012/0050458 A1* | 3/2012 | Mauchly ............ H04N 5/23238 348/14.16 |
| 2012/0327172 A1 | 12/2012 | El-saban et al. |
| 2013/0021428 A1* | 1/2013 | Byers ................... G06F 3/1446 348/14.07 |
| 2013/0136358 A1 | 5/2013 | Dedhia et al. |
| 2013/0235224 A1 | 9/2013 | Park et al. |
| 2013/0242036 A1 | 9/2013 | Gorzynski et al. |
| 2015/0029294 A1 | 1/2015 | Lin et al. |
| 2015/0334398 A1 | 11/2015 | Socek et al. |
| 2016/0196675 A1 | 7/2016 | Kosmach et al. |
| 2017/0006260 A1 | 1/2017 | Fogarty et al. |
| 2017/0358092 A1 | 12/2017 | Bleibel et al. |
| 2019/0347803 A1 | 11/2019 | Lim et al. |

OTHER PUBLICATIONS

International Search Report & Written Opinion Issued in PCT Application No. PCT/US2019/029530, dated Jul. 23, 2019, 12 pages.

Li, et al., "Combining Shape and Appearance for Automatic Pedestrian Segmentation", In Proceedings of 23rd International Conference on Tools with Artificial Intelligence, Nov. 7, 2011, pp. 369-376.

Saad, et al., "Real Time Object Oriented 6-Point Skeleton Extraction Component from Human Silhouette for Video Surveillance and Analysis Application", In International Visual Informatics Conference, Advances in Visual Informatics, Oct. 27, 2015, pp. 367-380.

"Non Final Office Action Issued in U.S. Appl. No. 15/975,740", dated Nov. 26, 2019, 10 Pages.

* cited by examiner

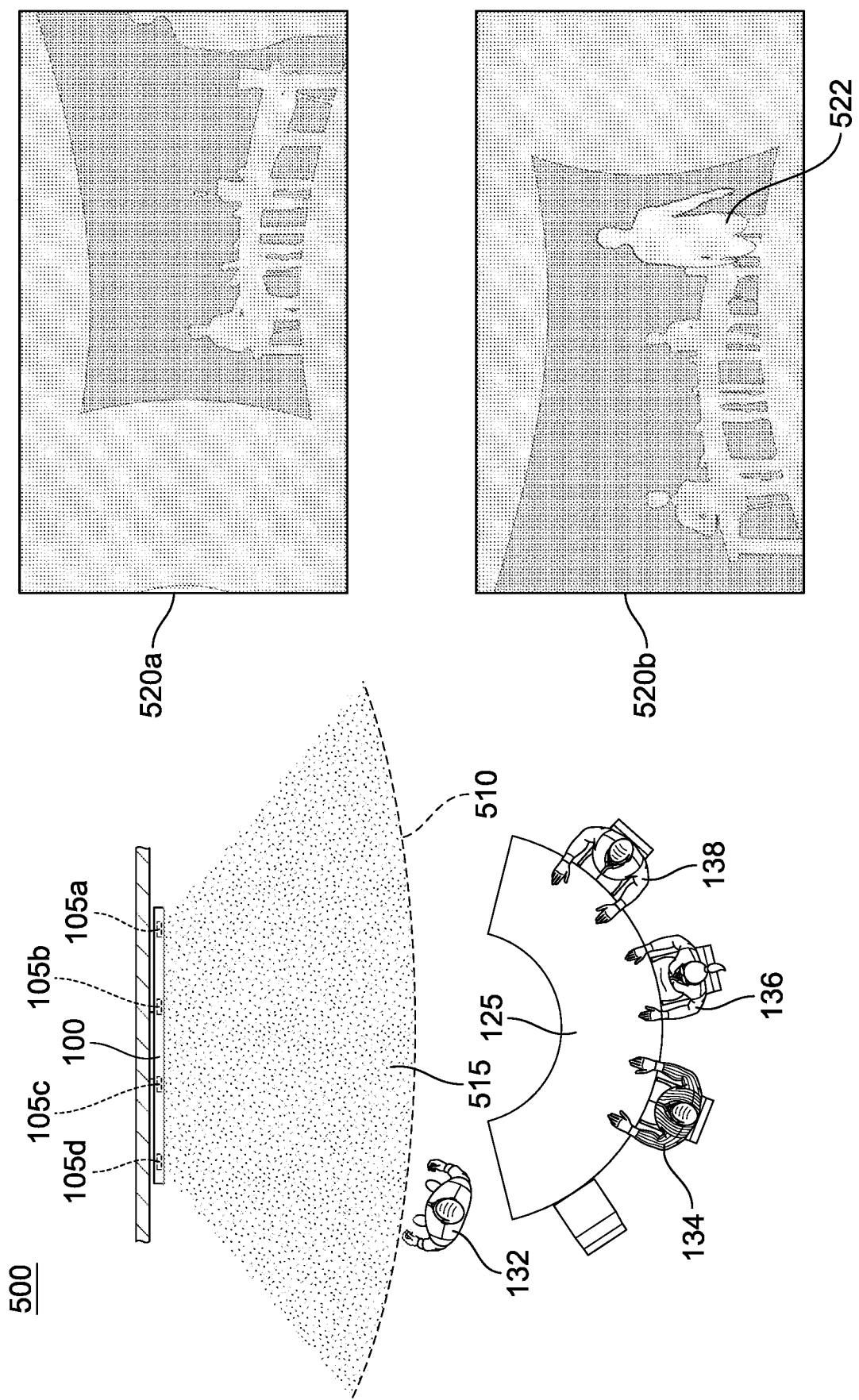

740a

740b

750a

750b

760a

760b

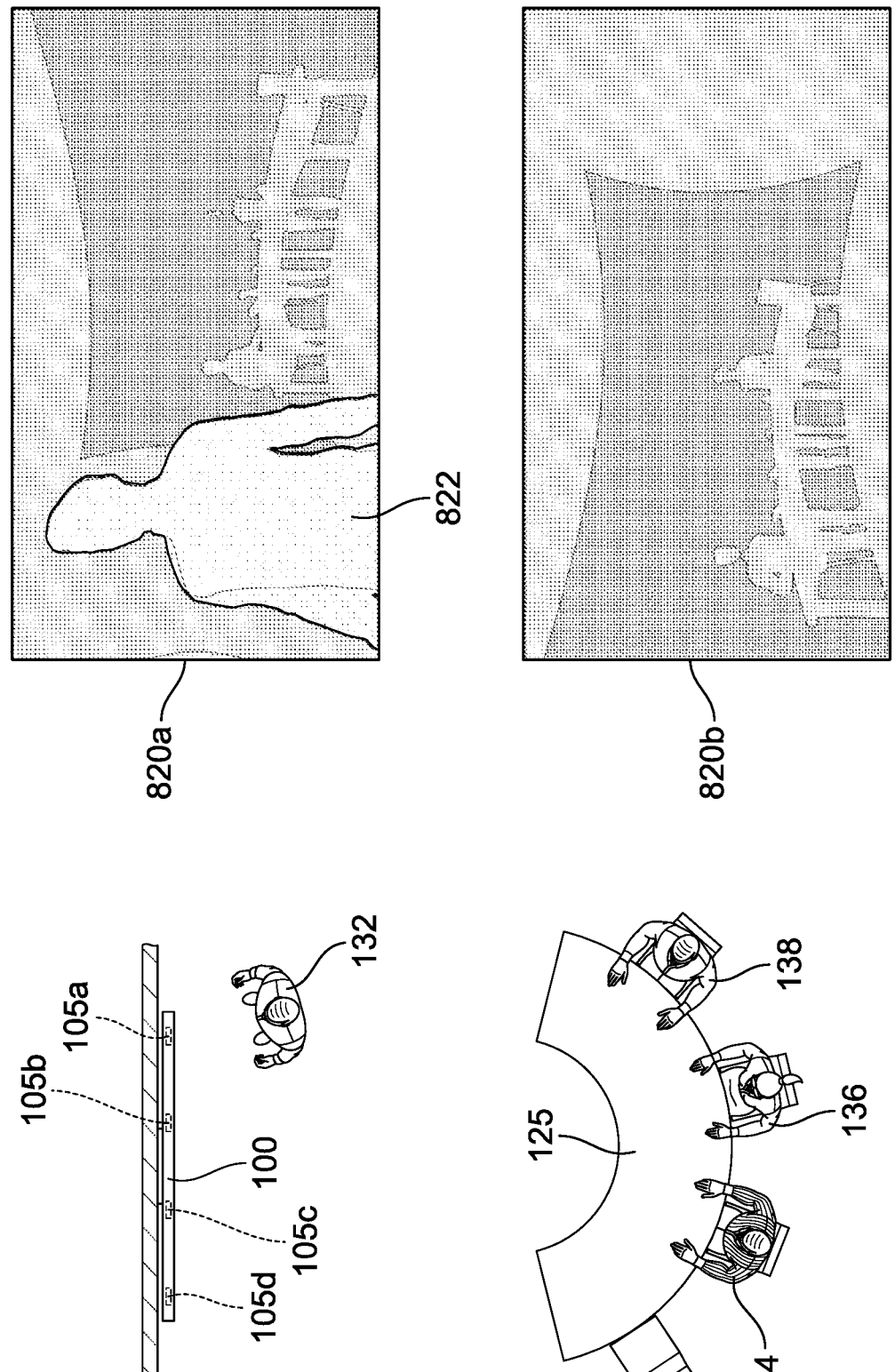

VIDEO CAPTURE SYSTEMS AND METHODS

CROSS REFERENCE TO RELATED APPLICATION

This application is a continuation of, and claims the benefit of priority from, U.S. patent application Ser. No. 15/835,413, filed on Dec. 7, 2017, and entitled "Video Capture Systems and Methods," which is incorporated by reference herein in its entirety.

BACKGROUND

Video conferencing technologies have become increasingly commonplace. Such technologies are now being used worldwide for a wide variety of both personal and business communications. For example, during a teleconference or other video conferencing session, individuals may "interact" and engage in face-to-face conversations through images and sound captured by digital cameras and transmitted to participants. There is a growing reliance on such network-based video conferencing and video chat applications and services, such as Skype®, Google Chat®, and iChat®. However, video conferencing in which participants do not remain relatively stationary continue to present significant challenges in image capture and display quality.

In some cases, there may be video conferences where participants wish to move through their environment, and/or where there may be multiple participants in a single room transmitting to other remote users or receivers. A video conference session in which there is real-time variability in the position of participants(s) relative to a camera or to one another may preclude the capture of a consistent or reliable view of the participants(s) for the remote users. For example, as a participant moves closer to a video camera, such as to interact with a display positioned close to the camera, the participant may obstruct a remote user's view of the environment. This may be compounded by the presence of multiple participants. The ability to discern faces and/or expressions for stationary participants can be limited in such situations. Although various techniques have been employed for improving the quality of video conferencing, there remain significant areas for new and improved ideas for capturing and presenting video in video conferencing sessions.

SUMMARY

A video capture system is disclosed. The video capture system includes a plurality of cameras configured to capture RGB images, as well as a foreground camera selector configured to select one of the plurality of cameras as a first foreground camera based on a first position of a first subject in relation to the plurality of cameras. In addition, the system includes a foreground segmenter configured to receive a first RGB image captured by the first foreground camera and identify a first foreground portion of the first RGB image, where the first foreground portion corresponds to the first subject, and where a total height of the first foreground portion is a first percentage of a total height of the first RGB image. Furthermore, the system includes a foreground image generator configured to generate a first foreground image from the first foreground portion of the first RGB image, and an image compositor. The image compositor is configured to generate a first portion of a first composite image from the first foreground image and a first background image, where a total height of the first foreground image in the first composite image is a second percentage of a total height of the first composite image and the second percentage is substantially less than the first percentage. The system also includes an image encoder configured to encode the first composite image for transmission to a remote system.

In another implementation, a method is disclosed, where the method includes determining a first position of a first subject in relation to a plurality of cameras, selecting a first foreground camera from the plurality of cameras based on at least the determined first position, and obtaining a first RGB image captured by the first foreground camera. The method further includes segmenting the first RGB image to identify a first foreground portion of the first RGB image, the first foreground portion corresponding to the first subject, where a total height of the first foreground portion is a first percentage of a total height of the first RGB image, and generating a first foreground image from the first foreground portion of the first RGB image. In addition, the method includes the producing a first composite image, including compositing the first foreground image and a first background image to produce a portion of the first composite image, where a total height of the first foreground image in the first composite image is a second percentage of a total height of the first composite image and the second percentage is substantially less than the first percentage, and then causing the first composite image to be displayed on a remote system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 5A illustrates an example of a top view of a scene during the video conferencing session described for FIGS. 4A and 4B.

FIG. 8A illustrates an example of a top view of a scene during the video conferencing session described for FIGS. 4A-7C.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. In the following material, indications of direction, such as "top" or "left," are merely to provide a frame of reference during the following discussion, and are not intended to indicate a required, desired, or intended orientation of the described articles unless expressly indicated.

Figure 1:
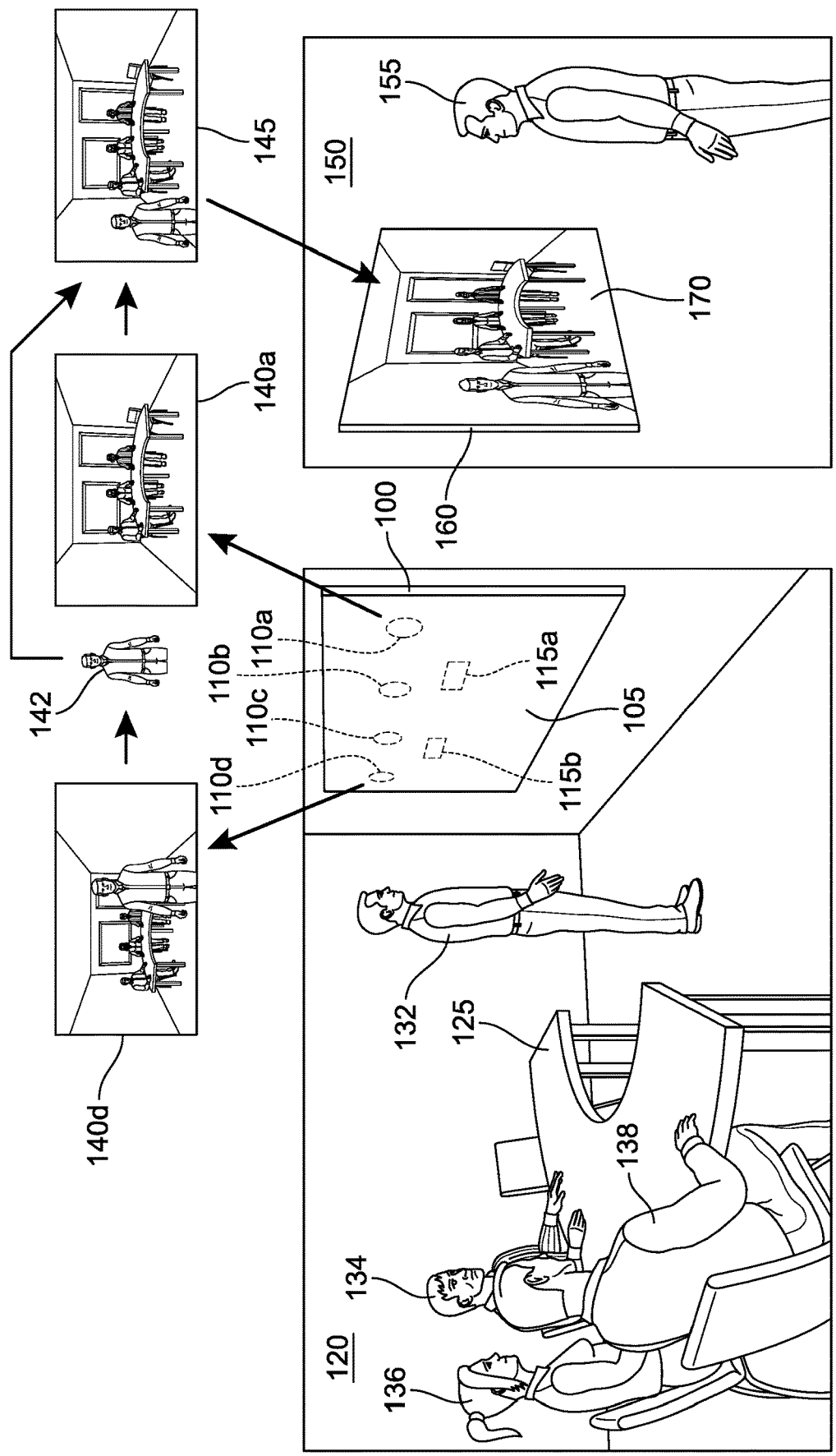
FIG. 1 illustrates an example of a video capture system arranged and operating to provide a video stream depicting subjects at a first geographic location to a remote display system at a second geographic location.

FIG. 1 illustrates an example of a video capture system 100 arranged and operating to provide a video stream depicting subjects at a first geographic location 120 to a remote display system 160 at a second geographic location 150. In the examples illustrated in FIGS. 1 and 4A-9D, the video capture system 100 (which may also be referred to as a "local video capture system 100") is embodied as an interactive display system that includes a display screen 105 for presenting images, although it is noted that the video capture system 100 is not limited to such embodiments. For example, in some implementations, the video capture system 100 may not include a display screen or may include a display screen used for limited and/or secondary purposes. In FIG. 1, the display screen 105 is positioned to present images to users at the first geographic location 120. In some examples, the video capture system 100 may be configured to display images and/or video streams from one or more remote systems participating in a video conferencing session with the video capture system 100, such as from the remote display system 160. For example, the video capture system 100 may be mounted on a wall, as illustrated in FIG. 1, or on a stand. In some examples, the display screen 105 is also configured to operate as a touch screen to receive user input. In this example, the first geographic location 120 is a conference room with users 134, 136, and 138 seated at a table 125 and a user 132 standing in closer proximity to the video capture system 100. The example illustrated in FIG. 1 is not intended to limit applications or environments in which the video capture system 100 may be used. Also, in order to more compactly illustrate features of the first geographic location 120, the desk 125 is shown closer in FIG. 1 than in FIGS. 4A-9D below.

In the example illustrated in FIG. 1, the video capture system 100 is configured to, among other things, serve as an endpoint in a video conferencing session. At the time illustrated in FIG. 1, the four users 132, 134, 136, and 138 are participating in the video conferencing session via the video capture system 100. The users 132, 134, 136, and 138 may also be referred to as "participants" in the video conferencing session. The term "video conferencing" applies to electronic communications in which a video stream including images captured by a first participant system is received and displayed by at least a second participant system, and may include, but does not require, the first participant system displaying a video stream provided by the second participant system. The illustrated video conferencing session includes another remote participant 155 at a second geographic location 150, who is participating via the remote display system 160 (which may also be referred to as a "remote participant system") configured to serve as an endpoint in the video conferencing session. In some examples, the remote display system 160 may be substantially similar to the illustrated embodiment of the video capture system 100. However, the remote display system 160 may include conventional video conferencing systems adapted to display a video stream received for a video conferencing session, but which do not include or implement various features described herein for the video capture system 100. The remote display system 160 receives the video stream via a data communication network (not illustrated in FIG. 1). It is noted that use of the video capture system 100 is not necessarily limited to video conferencing activities. For example, the video capture system 100 may provide a virtual whiteboard or run arbitrary computer program applications, and display information and/or user interfaces for such other activities on the display screen 105. Such other activities may be performed concurrently with video conferencing.

The video capture system 100 includes a plurality of RGB (red-green-blue) cameras 110a, 110b, 110c, and 110d (collectively referred to as "RGB cameras 110"). Although the example illustrated in FIG. 1 includes four RGB cameras 110, in other implementations there may two or more RGB cameras 110. In some examples, some or all of the RGB cameras 110 are positioned behind the display screen 105 to capture images from light received through the display screen 105, such as is illustrated for the four RGB cameras 110a, 110b, 110c, and 110d in the example of FIG. 1. By placing RGB cameras 110 behind display screen 105, subject gazes may generally be oriented more towards the RGB cameras 110, greater numbers of RGB cameras 110 may be more easily included, RGB cameras 110 may arranged to capture images of a subject from more natural angles, and an additional non-display user-facing surface (such as a bezel) is not necessary for the RGB cameras 110. The RGB cameras 110 are positioned such that, when the video capture system 100 is operated, a leftmost RGB camera 110 and a rightmost RGB camera 110 span a horizontal distance that is at least large enough, in most conditions, to obtain a view around a human subject located close to and within a field of view (FOV) of one or more of the RGB cameras 110. For example, in FIG. 1, an image of the user 132 is included in an image 140d captured by the RGB camera 110d, whereas the user 132 is not visible in an image 140a captured by the RGB camera 110a at approximately the same time. In some examples, the RGB camera 110a may be positioned at a height less than or about equal to a height of the RGB camera 110d. Various other arrangements and numbers for the RGB cameras 110 are also effective, such as, but not limited to, an array, along multiple parallel lines, or along perpendicular lines (for example, to increase a horizonal span when operated in portrait orientation perpendicular to the landscape orientation illustrated in FIG. 1).

In some implementations, the video capture system 100 includes one or more depth cameras (collectively referred to as "depth cameras 115"). In some examples, some or all of the depth cameras 115 are positioned behind the display screen 105 to capture light for depth estimation through the display screen 105, such as is illustrated for the two depth cameras 115a and 115b in the example of FIG. 1. By placing depth cameras 115 behind display screen 105, greater numbers of depth cameras 115 may be more easily included, and an additional non-display user-facing surface is not necessary for the depth cameras 115. A depth estimate may also be referred to as an "estimated depth," "distance estimate," or "estimated distance." As described in more detail below, depth estimates obtained using the depth cameras 115 may be used to, among other things, determine when a subject has come into proximity to the video capture system 100, determine a distance between the video capture system 100 and a subject, determine a position of a subject relative to one or more of the RGB cameras 110, and/or identify discontinuities in a depth image and related depth image data used to perform image segmentation for a subject.

As will be described in more detail in later examples, the video capture system 100 is configured to select a foreground camera from the multiple RGB cameras 110 for capturing one or more images of an identified subject (for example, a human subject). The term "foreground" may be abbreviated as "FG" in portions of this disclosure. For the discussion of FIG. 1, the participant 132 may also be referred to as "subject 132." In some implementations, a foreground camera may be selected based on at least a position of the subject 132 in relation to the RGB cameras 110; for example, by identifying an RGB camera 110 in which the subject 132 is expected or otherwise determined to be within the RGB camera's field of view (FOV). In some implementations, the depth cameras 115 may be used to determine a position of the subject 132. In the example shown in FIG. 1, the RGB camera 110d has been selected as a foreground camera for the subject 132, and an image of the subject 132 has been captured by the selected RGB camera 110d in the RGB image 140d. Image segmentation is performed to identify a foreground portion of the RGB image 140d corresponding to the subject 132, which is used to generate a foreground image 142 of the subject 132.

Additionally, the video capture system 100 is configured to select a background camera from the multiple RGB cameras 110 for capturing one or more images of at least a portion of a background area behind the subject 132. The term "background" may be abbreviated as "BG" in portions of this disclosure. In some implementations, a background camera may be selected based on at least a position of the subject in relation to the RGB cameras 110; for example, by identifying a camera in which the subject is expected to occupy little or none of the camera's FOV. In the example shown in FIG. 1, the RGB camera 110a has been selected as a background camera, and a background image 140a has been obtained from the selected RGB camera 110a. The background image 140a may span only a portion of a total FOV of the RGB camera 110a. In this particular example, the background image 140a includes images of the table 125 and the participants 134, 136, and 138, but does not show the subject 132.

In the example shown in FIG. 1, the foreground portion of the RGB image 140d corresponding to the subject 132 is reduced in size to generate the foreground image 142, and a composite image 145 is generated from the background image 140a and the foreground image 142. Portions of the background not captured by the foreground camera, but which were captured by the background camera, are visible in the resulting composite image 145. For example, in composite image 145, the subject 132 does not occlude the table 125 or a door behind the table 125. Further, an image of the subject 132 occupies a substantially smaller portion of the composite image 145 than in the original RGB image 140d. Also, in this particular example, the position of the foreground image 142 relative to background features in the composite image 145 does not correspond to the position of the subject 132 relative to those background features as captured by one or more of the RGB cameras 110. For example, in the original RGB image 140d, the subject 132 is seen to the right of the participants 134, 136, and 138; however, in the composite image 145, the subject 132 is seen to the left of the participants 134, 136, and 138.

The composite image 145 is digitally encoded, for example, but not limited to, as a frame of a video stream. The encoded image is then provided to the remote display system 160, thereby causing the composite image 145 to be displayed, at least in part, as an image 170 on the remote display system 160, such as via a video conferencing application program executed by the remote display system 160. Similar processing may be performed to generate multiple composite images, based on images captured by the RGB cameras 110, used for a sequence of frames that are encoded in the video stream transmitted to remote display systems participating in the video conferencing session. Although in FIG. 1 the image 170 is illustrated as occupying an entire display surface of the remote display system 160, the image 170 may be displayed in a subportion of the display surface; for example, the image 170 may be displayed in a window or a video display region of a user interface. The video capture system 100 may display images received from one or more remote systems in a similar manner.

Figure 2:
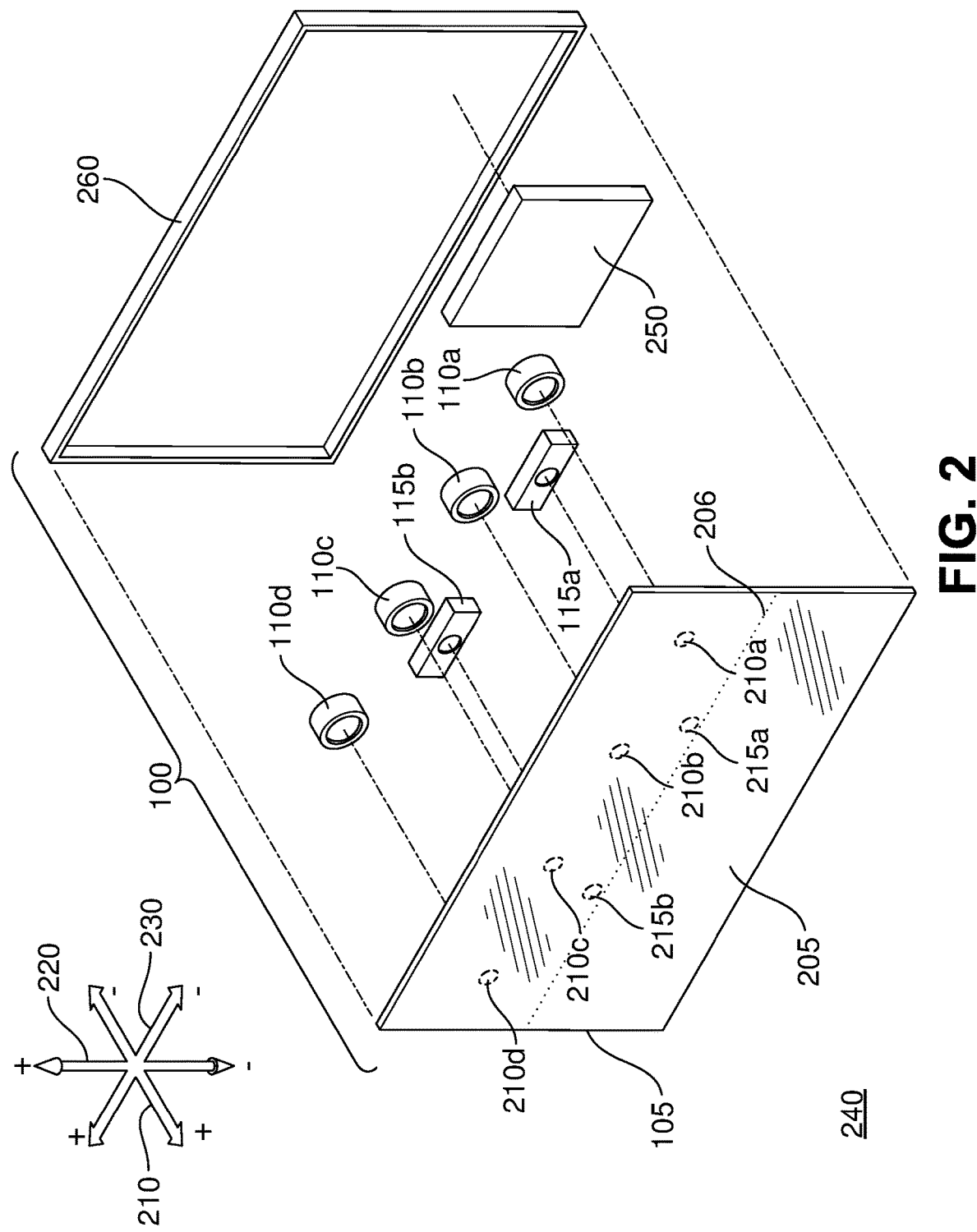
FIG. 2 illustrates an example of an exploded view of the video capture system illustrated in FIG. 1.

FIG. 2 illustrates an exploded view of the video capture system 100 illustrated in FIG. 1. For purposes of clarity and discussion, FIG. 2 is presented with reference to a horizontal axis 210, a longitudinal axis 220, and a lateral axis 230. With respect to the horizontal axis 210, a positive direction (illustrated with "+") may be referred to as a "forward" direction, and a negative direction (illustrated with "−") may be referred to as a "backward" direction. With respect to the longitudinal axis 220, a positive direction (illustrated with "+") may be referred to as an "upward" direction, and a negative direction (illustrated with "−") may be referred to as a "downward" direction. The display screen 105 is arranged perpendicular to the horizontal axis 210 and configured to emit light through a front (and user-viewable) surface 205 of the display screen 105 (which also, in this example, is a front surface 205 of the video capture system 100) in response to signals received from a controller 250 included in the video capture system 100. In some examples, the display screen 105 includes multiple display panels. The display screen 105 may be implemented with technologies such as liquid-crystal displays (LCDs), organic light-emitting diode type displays (OLEDs), quantum dot-based displays, or various other light-emitting displays that permit RGB cameras 110 to capture suitable images through the display screen 105. Light received by the RGB cameras 110a, 110b, 110c, and 110d from a scene 240 in front of the display screen 105 passes through respective RGB camera display areas 210a, 210b, 210c, and 210d of the display screen 105 (collectively referred to as "RGB camera display areas 210"). Light received by the depth cameras 115a and 115b from the scene 240 passes through respective depth camera display areas 215a and 215b of the display screen 105 (collectively referred to as "depth camera display areas 215"). One or more scene illumination sources (not illustrated in FIG. 2) may also be positioned behind the display screen 105. For example, each of the depth cameras 215 may include an integrated IR illumination source.

Various configurations may be used to allow the RGB cameras 110 to capture images through the display screen 105. In some implementations, the display screen 105 is a forward-emitting display screen, such as an OLED-based forward-emitting display screen, arranged such that a small portion or substantially none of the light emitted by the display screen 105 is emitted through a rear surface of the display screen 105. For example, some OLED-based forward-emitting display screens have about a 5% backward emission of display light. In some implementations, image correction is performed to correct for backward-emitted light; for example, image contents for a RGB camera display area may be used to estimate and subtract or otherwise correct the effect of backward-emitted light captured by an RGB camera. With a forward-emitting display screen 105, the RGB cameras 110 and/or the depth cameras 115 may capture images at any time, independent of synchronization with operation of the display screen 105.

In some implementations, image capture operations performed by the RGB cameras 110 are synchronized with at least operation of their respective RGB camera display areas 210 of the display screen 105. For example, image capture periods for an RGB camera 110 may be performed when its respective RGB camera display area 210 is not emitting light, such as, but not limited to, in synchronization with display refresh periods or by displaying a dimmed image (including, for example, a black image) in the RGB camera display area 210 during image capture operations. In some implementations, depth image capture operations performed by the depth cameras 115 are similarly synchronized with at least operation of their respective depth camera display areas 215. In the example video capture system 100 in FIGS. 1 and 2, each of the RGB cameras 110 is positioned at about a same first distance upward (and away) from a lateral midline 206 of the display screen 105. However, in other implementations, the positions of the RGB cameras 110 relative to one another and/or the lateral midline 206 can vary.

The video capture system 100 also includes the controller 250. The controller 250 includes a logic subsystem, a data holding subsystem, a display controller, and a communications subsystem, and is communicatively coupled to the display screen 105, RGB cameras 110, and depth cameras 115. The logic subsystem may include, for example, one or more processors configured to execute instructions and communicate with the other elements of the video capture system 100 according to such instructions to realize various aspects of this disclosure involving the video capture system 100. Such aspects include, but are not limited to, configuring and controlling the other elements of the video capture system 100, input and commands, communicating with other computer systems, and/or processing images captured by the RGB cameras 110 and the depth cameras 115. The data holding subsystem includes one or more memory devices (such as, but not limited to, DRAM devices) and/or one or more storage devices (such as, but not limited to, flash memory devices). The data holding subsystem includes one or more media having instructions stored thereon which are executable by the logic subsystem, which cause the logic subsystem to realize various aspects of this disclosure involving the video capture system 100. Such instructions may be included as part of firmware, an operating system, device drivers, application programs, or other executable programs. The communications subsystem is arranged to allow the video capture system 100 to communicate with other computer systems. Such communication may be performed via, for example, wired or wireless data communication.

The video capture system 100 also includes an enclosure 260, arranged to be mechanically coupled to the display panel 105 and enclose internal components of the video capture system 100, including the RGB cameras 110, depth cameras 215, and controller 250. The enclosure 260 may also be referred to as a "housing." In this example, when the illustrated video capture system 100 is assembled, the RGB cameras 110 are all encompassed by the single enclosure 260 and positioned behind the single display screen 105.

Although in FIGS. 1 and 2 various elements and features of the video display system 100 are described as being integrated into a single device, in other implementations, various elements and features of the video capture system 100 may be implemented across multiple devices. For example, a portion of the controller 250 may be provided by a computer system not enclosed by the enclosure 260, some or all of the plurality of RGB cameras 110 may be included in one or more separate devices instead of being positioned behind the display screen 105, and/or some or all of the depth cameras 115 may be included in one or more separate devices instead of being positioned behind the display screen 105.

Figure 3:
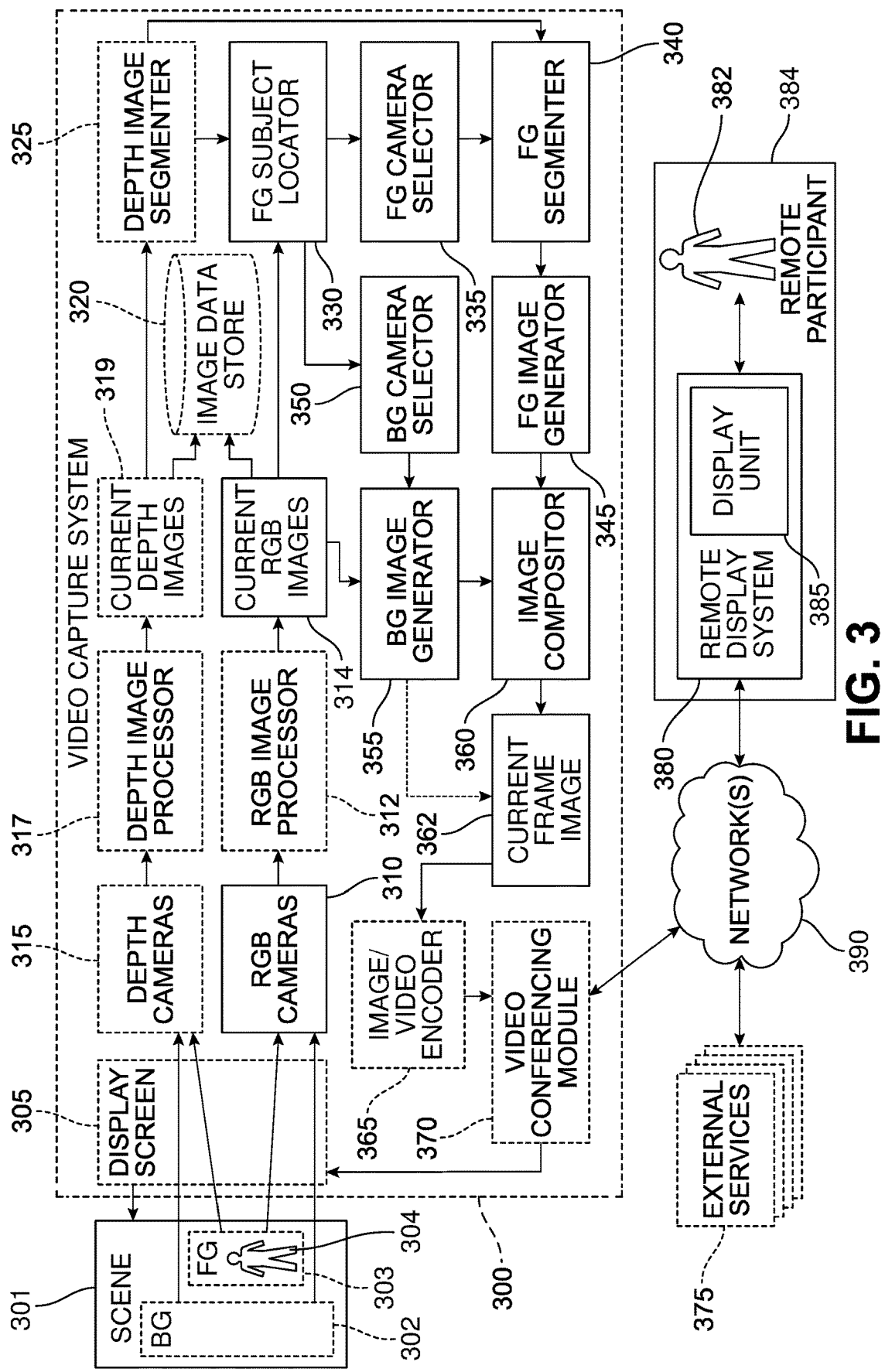
FIG. 3 illustrates an example of a video capture system.

FIG. 3 illustrates an example schematic diagram showing features included in an example video capture system 300 implementing various features described herein. The video capture system 300 may include any of the features described above for video capture system 100 in FIGS. 1 and 2. Additionally, the features described for the video system 300 may be included in the video capture system 100. Although aspects of features illustrated in FIG. 3 may be described with a focus on being applied to generate one current frame image 362, it is understood that these features would be similarly applied to generate additional frame images, such as a series of frame images for a video stream.

Much as described above for the video capture system 100, the video capture system 300 includes a plurality of RGB cameras 310 arranged to capture RGB images of a scene 301 from different positions. The RGB images captured by the RGB cameras 310 may include images for a background portion 302 (or "background 302") of the scene 301 and/or for a foreground portion 303 of the scene 301, which may include a human foreground subject 304 (or another foreground subject) in closer proximity to the RGB cameras 310. In some implementations, the video capture system 300 includes a display screen 305 and the RGB cameras 310 are positioned behind a display screen 305 to capture RGB images using light received through the display screen 305, much as illustrated in FIGS. 1 and 2.

FIG. 3 illustrates current RGB images 314, having at least one RGB image captured by at least one of the RGB cameras 310 at approximately a first time and used for generating the current frame image 362, which corresponds to the first time. The current RGB images 314 includes at least one RGB image captured by the RGB cameras 310 that was not included in the RGB images 314 used to generate a previous frame image. There are various ways in which this may be implemented. In some implementations, new images are obtained from each of the RGB cameras 310 at approximately the same rate that new frame images are generated. For example, where a new current frame image 362 is to be generated at a first frequency (such as, but not limited to, 24 Hz, 30 Hz, or 60 Hz), each of the RGB cameras 310 may be operated to capture a new RGB image at the first frequency; for a frame rate of 30 Hz and four RGB cameras, this would amount to 120 new RGB images every second. In some implementations, new RGB images are obtained for the current RGB images 314 more selectively, where based on a determination that RGB images from a first subset of the RGB cameras 310 will not be used to generate the current frame image 362, the current RGB images 314 may not include new RGB images from the first subset of RGB cameras 310. For example, RGB images from only one of the RGB cameras 310 may be used to generate a "background-only" frame images when no foreground subject 304 is present. As another example, for some frames, new RGB images are only needed for generating a foreground image (such as, but not limited to, where new background images are generated at a slower rate than foreground images, or where background images are generated from a different image source, such as a selected video or still image). Selection of the first subset of RGB cameras 310 may be based on at least distance determinations made using depth images obtained from the depth cameras 315, which may be determined separately and/or at a different rate. Selection of the first subset of RGB cameras 310 may be based on at least a predicted position of a foreground subject 304, which is effective in the short term for human subjects in many circumstances due to their slow movement relative to the frame rate. By reducing the number of RGB cameras 310 used to obtain new current RGB images 314 to generate a current frame image 362, power and bandwidth used for the RGB cameras 310 is reduced, and amounts of energy and computation resources is reduced for processing the images obtained from the RGB cameras 310.

In different implementations, the video capture systems described herein can be configured to optimize the capture of close human subjects (for example, human subjects within 2 meters of a video capture system), such as with various arrangements of the RGB cameras 310 (which may also be applied to the RGB cameras 110 in FIGS. 1 and 2). In some implementations, the plurality of RGB cameras 310 can be arranged such that when a view of the background 302 by a first RGB camera 310 is blocked or partially obstructed, for example, by the human foreground subject 304, at least one of the remaining RGB cameras 310 is positioned to allow substantially complete capture of the background 302 or a particular portion of the background 302. In other words, at a time when the first RGB camera 310 is obstructed, a second RGB camera 310 is available to continue to capture the obstructed portion of the background 302. In some implementations, the remaining unobstructed RGB cameras 310 are laterally positioned relative to the obstructed first RGB camera 310 so as to be effective to obtain a view "around" the human foreground subject 304, as illustrated previously in the RGB images 140a and 140d captured by respective RGB cameras 110a and 110d in FIG. 1.

For example, in some implementations, the human foreground subject 304 may walk in close proximity to the video capture system 300. During this time, the human foreground subject 304 may be adjacent to a first RGB camera 310, thereby at least partially obstructing the view of the background 302 for the first RGB camera 310. However, because of the arrangement of the remaining RGB cameras 310, the video capture system 300, via one or more of the remaining RGB cameras 310, can continue to obtain a substantially complete image of the background 302. In one implementation, the RGB cameras 310 are arranged such that a leftmost RGB camera and a rightmost RGB camera span a horizontal distance that is at least large enough to continue to capture one or more images of the background 302 that may be obstructed. Thus, in ordinary operation of the video capture system 300, when the human foreground subject 304 is standing close to a first RGB camera, one or more of the remaining RGB cameras 310 will be effective in capturing images of one or more areas of the background 302 obstructed by the human foreground subject 304 for the first RGB camera 310. Thus, in some implementations, the arrangement of the RGB cameras 310 permits the system to compensate for one or more obstructions in at least one camera's FOV.

In different implementations, the arrangement of the RGB cameras 310 may also be configured to ensure the optimal capture of human foreground subjects located close to the RGB cameras 310. Thus, while the RGB 310 cameras may generally be disposed in various arrangements, in some implementations, each of the RGB cameras 310 are positioned in a manner consistent with the dimensions typically associated with a human-based presentation session. It should be understood that, in at least some implementations, this arrangement allows each RGB camera 310 to capture a face and a substantial portion of a torso of the human foreground subject 304 while facing the RGB camera 310, in close proximity to the RGB camera 310, and laterally aligned with an optical axis of the RGB camera 310. In some implementations, the physical arrangement of the RGB cameras 310 relative to one another can take into account a typical range of human shape and size (for example, based on a human height of approximately between 155 and 185 cm), as well as a general room configuration (for example, based on video capture system 300 or the RGB cameras 310 included therein being mounted at an assumed height above a floor in front of the RGB cameras 310). For example, in some implementations including a display screen 305, some or all of the RGB cameras 310 will be placed at approximately a same first distance from a lateral midline of the display screen 305 (as illustrated by positioning of RGB cameras 110 above the lateral midline 206 illustrated in FIG. 2). For example, this first distance may correspond to an expected or average eye height in operation, facilitating alignment of a subject's gaze with RGB cameras 310. Furthermore, in some cases, the RGB cameras 310 may be positioned such that one or more of the RGB cameras 310 are generally adjacent or proximate to a lateral midline of the display screen 305. Thus, in some implementations, one or more of the RGB cameras 310 may be positioned to ensure the capture of each of the participants, whether they are in the foreground or in the background.

In some implementations, the video capture system 300 includes one or more depth cameras 315 configured to capture depth images 319 (which may be referred to as "depth maps") with estimated distances from the depth cameras 315 to surfaces in the scene 301. In some implementations, the depth cameras 315 may be time of flight (TOF) depth cameras (gated or phase-based), configured to determine times for infrared light pulses emitted by a depth camera to reflect from surfaces in scene 301 and be received by pixel sensor elements included in the depth camera. The "time of flight" determined for a pixel sensor corresponds to a distance between the depth camera and a corresponding surface in the scene 301 corresponding to a direction and/or angular area for the pixel sensor. In some implementations, a depth camera 315 may estimate distances based on reflections from the scene 301 of a structured infrared light projected by the depth camera 315. In some implementations, a depth camera 315 may include a hybrid sensor, capable of capturing both RGB images and depth images. In some implementations, a depth camera 315 may be implemented using two or more cameras used for stereoscopic depth estimation. For example, two of the RGB cameras 310 might be used for stereoscopic depth estimation. In some implementations, the video capture system 300 includes a display screen 305 and the depth cameras 315 are positioned behind the display screen 305 to capture depth images using light received through the display screen 305, much as illustrated in FIGS. 1 and 2. In some implementations, new depth images are obtained from the depth cameras 315 at a substantially lower rate than the frame rate for new current frame images 362. In some implementations, the depth cameras 315 may be selectively used for the current depth images 319, similar to the selective use of the RGB cameras 310 for the current RGB images 314 described above. Such approaches for reducing amounts of depth image generation and processing are particularly effective in reducing power and processing requirements.

In some implementations, the video capture system 300 includes an RGB image processor 312 configured to perform processing, including preprocessing, of the RGB images 314 for use by other elements of the video capture system 300. Examples of such processing include, but are not limited to, correction of lens-induced optical distortion (which may be substantial in peripheral images captured by wide angle RGB image cameras), color correction, noise reduction, and/or deconvolution to reduce effects of diffraction caused by structures included in display screen 305. In some example, values used for such deconvolution may be generated as part of a calibration process performed during manufacturing or installation of the video capture system 300. In some implementations, the video capture system 300 includes a depth image processor 317 configured to perform similar processing of depth images 319. In some implementations, some or all of the processing performed by the RGB image processor 312 and/or the depth image processor 317 is also done for the benefit of other systems making use of the RGB images 314 and/or the depth images 319, such as, but not limited to, a skeletal tracking system and/or a gesture recognition system for gesture-based user input. Examples of image processing are described in U.S. Patent Application Publication Number 2005/0180656, published on Aug. 18, 2005 and entitled "System and Method for Head Size Equalization in 360 Degree Panoramic Images" and U.S. Patent Application Publication Number 2006/0028735, published on Feb. 9, 2006 and entitled "Real-Time Wide-Angle Image Correction System and Method for Computer Image Viewing," each of which is incorporated by reference herein in their entireties.

In some implementations, the video capture system 300 may include an image data store 320 to retain image data and metadata for images captured by the RGB cameras 310 and/or the depth cameras 315. For example, recently captured RGB images 314 may be temporarily stored in the image data store 320 to provide missing RGB image data for generating later composite images. Any of the elements included in the video capture device may provide image data for storage in the image data store 320 and/or retrieve image data being stored by the image data store 320.

In some implementations, the video capture system 300 includes a depth image segmenter 325 that is configured to receive and segment the current depth images 319. In some examples, the current depth images 319 are captured at approximately a same time as when the current RGB images 314 being used to generate the current frame image 362 were captured by the RGB cameras 314. In some implementations, the depth image segmenter 325 is configured to segment the depth images 319 to identify foreground portions of the depth images 319 based on at least discontinuities in the depth images 319 around edges of the identified foreground portions. In some examples, the depth image segmenter 325 may discard or ignore depth estimates that exceed a first threshold distance. The depth image segmenter 325 may perform additional processing of the depth images 319, such as determining a distance and/or position for the identified foreground portions with respect to the video capture system 300.

The video capture system 300 includes a foreground subject locator 330 configured to determine whether there are currently any foreground subjects in proximity to the video capture system 300 and/or the RGB cameras 310, and determine a respective position for each current foreground subject. This determination may be based at least in part on the depth images 319 and/or any foreground portions identified by the depth image segmenter 325. In some examples, the foreground subject locator 330 may discard or ignore foreground portions identified by the depth image segmenter 325 having a determined distance that exceeds a second threshold distance and/or a determined position that is outside of a foreground space defined for the video capture system 300. In some implementations, the foreground subject locator 330 does not rely on depth images 319 captured by depth cameras 315, and instead bases its determination on at least the RGB images 319. For example, RGB image processing techniques such as, but not limited to, facial recognition and/or optical flow analysis may be effective to determine a foreground subject is present and estimate a position of the foreground subject. In some examples, the foreground subject locator 330 determines a foreground subject is present and estimates a position of the foreground subject based in part on image data retrieved from the image storage 320. Additionally, the foreground subject locator 330 may maintain an internal state between successive frames, such as, but not limited to, foreground subject positions determined for previous frames. In some implementations, an array of microphones, included in the video capture system 300 system and/or positioned elsewhere, may be used to determine a position of a currently speaking subject. In some implementations, a foreground subject may be selectively identified based on at least a determination that foreground subject is currently or was recently speaking.

The video capture system 300 includes a foreground camera selector 335 configured to, for each of the foreground subjects identified by the foreground subject locator 330, select one of the RGB cameras 310 as a foreground camera from which a current RGB image 314 will be obtained for generating a foreground image for the foreground subject. As a result, the foreground camera selector 335 selects an original or source RGB image 314 for each foreground subject. Selection of a foreground camera for a foreground subject may be based on at least a position determined for the foreground subject by the foreground subject locator 330 in relation to the RGB cameras 110. Selection of a foreground camera for a foreground subject may be based on at least an orientation of the foreground subject toward the RGB cameras 310. For example, where two or more of the RGB cameras 310 might be selected for a foreground subject, the foreground camera selector 335 may select the foreground camera based on a determination that the foreground subject's body, torso, head, and/or gaze are oriented more towards the selected foreground camera. In some implementations, the foreground camera selector 335 may select a foreground camera based on at least one or more foreground segmentations performed by a foreground segmenter 340 included in the video capture system 300. For example, positions, sizes, shapes, and/or areas of first and second foreground portions identified by the foreground segmenter 340 for a foreground subject in respective first and second RGB images 314 may be used to select the first RGB camera 310 as the foreground camera for the foreground subject.

The foreground segmenter 340 is configured to receive an RGB image 314 and identify a foreground portion of the RGB image 314 for a foreground subject identified by the foreground subject locator 330. For example, the foreground segmenter 340 is used to identify a foreground portion of a current RGB image 314 captured by a foreground camera selected by foreground camera selector 335. Various image segmentation techniques may be applied to identify a foreground portion of an RGB image 314. In some implementations, machine learning and inference techniques, such as semantic segmentation or semantic labeling, may be used. In some implementations, the foreground portion of an RGB image 314 is identified based on at least brightness, color, or other boundaries detected in the RGB image 314, and/or grouping together adjacent pixels by texture, color, and/or intensity. In some examples, one or more graphical energy minimization techniques, such as, but not limited to the GrabCut method, may be used for image segmentation.

In some implementations, a first foreground portion of a first depth image 319 identified by the depth image segmenter 325 may be used to identify corresponding positions in a first RGB image 314 captured by a respective first RGB camera 310. For example, a depth estimate for a pixel included in the first foreground portion may be converted to a counterpart first three-dimensional (3D) point in a first coordinate system (such as, but not limited to, a camera coordinate system for a first depth camera 315 that captured the first depth image 319), which may be converted to a second 3D point in a second camera coordinate system for the first RGB camera 310 and/or a corresponding pixel position in the first RGB image 314. For conversions, transformations, and/or other computations performed to identify corresponding positions in the first RGB image 314, various techniques can be used individually or in combination, including, but not limited to, rotations and/or translations of two-dimensional (2D) and/or 3D points and/or vectors (including, for example, use or one or more transformation matrices); optical distortion correction for a depth camera and/or RGB camera (including, for example, correction of complex asymmetric optical distortion); geometric transformations such as, but are not limited to, affine transformations (linear conformal (scaling, translations, rotations) and shears), projective transformations (projections, homographies, and collineations), and piecewise linear transformations (for example, affine transformations applied separately to triangular regions of an image); and/or nonlinear image transformations such as, but not limited to, polynomial transformations, nonuniform scaling, circular or radial distortion (barrel, pincushion, moustache, and multi-order), and tangential distortion (for example, using Brown's model). Such techniques may be implemented using various techniques, such as, but not limited to, matrix operations, numerical approximation (such as Taylor series or Newton-Raphson), and/or mapping/interpolation. By identifying additional pixel positions in the first RGB image 314 that correspond to the first foreground portion, an initial image segmentation may be performed, which may be refined using other image segmentation techniques.

In some examples, although the first foreground portion of the first depth image 319 may provide depth estimate values at a relatively high precision (for example, 16-bit depth estimate values), the depth estimate values may be quantized into a relatively small number of depth bins for identifying corresponding positions in the first RGB image 314. In some implementations, the depth bins may each be a same thickness; for example, each depth bin may have a thickness, and respective range, of 10 cm. In some implementations, the depth bins may have different thicknesses; for example, the depth bins may increase in thickness as the distance from a depth camera increases. This reflects a reduced sensitivity to changes in distance as the distance increases. In implementations using such depth bins, for each depth bin for a depth camera 315, a translation matrix may be generated for each of the RGB cameras 310. For example, in a hypothetical video capture system 300 with four RGB cameras 310 that quantizes depth estimates into one of 10 depth bins, there would be four translation matrices for each depth bin (each translation matrix for a respective one of the four RGB cameras 310), with a total of forty translation matrices for each depth camera 315. By using these depth bins and their respective precomputed translation matrices, the amount of computation involved in translating depth estimates into pixel positions in RGB images 314 is substantially reduced without substantially reducing accuracy of the translations for the image segmentation performed by the foreground segmenter 340. This process reduces both energy consumption and the amount of computing resources needed to perform real-time image segmentation.

Various techniques for depth image and/or RGB image foreground/background segmentation are described in U.S. Patent Application Publication Number 2015/0310256, published on Oct. 29, 2015 and entitled "Depth Image Processing"; U.S. Patent Application Publication Number 2015/0248765, published on Sep. 3, 2015 and entitled "Depth Sensing Using an RGB Camera"; U.S. Patent Application Publication Number 2014/0126821, published on May 8, 2014 and entitled "Foreground and Background Image Segmentation"; U.S. Patent Application Publication Number 2013/0208983, published on Aug. 15, 2013 and entitled "Up-Sampling Binary Images for Segmentation"; U.S. Patent Application Publication Number 2013/0129227, published on May 23, 2013 and entitled "Environment and/or Target Segmentation"; U.S. Patent Application Publication Number 2013/0129155, published on May 23, 2013 and entitled "Motion Detection Using Depth Images"; and U.S. Patent Application Publication Number 2013/0057654, published on Mar. 7, 2013 and entitled "Method and System to Segment Depth Images and to Detect Shapes in Three-Dimensionally Acquired Data", each of which incorporated by reference herein in their entireties.

The video capture system 300 includes a foreground image generator 345 configured to generate a foreground image from a foreground portion of an RGB image 314 identified by the foreground segmenter 340. The generated foreground image is subsequently composited with a background image to produce a frame image 362 (which may also be referred to as "composite image 362" when generated by the image compositor 360) corresponding to the RGB image. A total height of the foreground portion is a first percentage (less than or equal to 100%) of a total height of the RGB image. The foreground image generator 345 is configured to resize the foreground portion of the RGB image (for example, by proportional scaling of the foreground portion to a smaller number of pixels) to generate the foreground image, such that a total height of the generated foreground image and/or a total height of the foreground image in the composite image 362 is a second percentage of a total height of the composite image 362, where the second percentage is substantially smaller than the first percentage. Likewise, a third percentage of the total area of the composite image 462 occupied by the generated foreground image is substantially smaller than a fourth percentage of the total area of the RGB image occupied by the foreground portion.

In some implementations, where a gaze direction of a foreground subject is determined to not be oriented toward the foreground camera, the eyes in the foreground image may be repainted to depict a gaze oriented toward the foreground camera. Whether such repainting is performed depend on a detected orientation of the foreground subject's face and/or head. For example, if the foreground subject's face is oriented too far away from the foreground camera, the eyes are not repainted in order to avoid displaying an unnatural gaze. Techniques for orientation estimation are described in U.S. Patent Application Publication Number 2015/0348269, published on Dec. 3, 2015 and entitled "Object Orientation Estimation," which is incorporated by reference herein in its entirety.

The video capture system 300 includes a background camera selector 350 configured to select one or more of the plurality of RGB cameras 310 as background cameras from which an RGB image 314 will be obtained for generating a background image. As a result, the background camera selector 350 selects an original or source RGB image 314 for each foreground subject. In the event that the foreground subject locator 330 determines that currently there are no foreground subjects, the background camera selector 350 may simply select a default background camera (for example, a centrally positioned RGB camera 310) or select the same background camera used for an immediately preceding frame.

When one or more foreground subjects have been identified by the foreground subject locator 330, selection of the background cameras may be based on at least the positions determined for the foreground subjects by the foreground subject locator 330. For example, the background camera selector 350 may use the positions and/or lateral extents determined for the foreground subjects to determine that the foreground subjects do not obstruct a selected background camera, or at least that the foreground subjects do not obstruct the selected background camera from capturing at least part of an area of the background 302 of interest for generating composite image 362. In some implementations, selection of a background camera may be based on at least one or more areas in which foreground images generated by the foreground image generator 345 will be located in the composite image 362. For example, if a foreground image will cover a portion of the background 302 that is obstructed in a current view of a first RGB camera 310, the first RGB camera 310 may still be selected as a background camera. In some implementations, the background camera selector 350 may select a background camera based on at least one or more foreground segmentations performed by a foreground segmenter 340, indicating which portions of the RGB images 314 are actually obstructed. In some implementations, the background camera selector 350 may select a background camera based on at least whether one or more faces detected in one or more of the RGB images 314 will be visible. Techniques for face detection are discussed in U.S. Patent Application Publication Number 2014/0133758, published on May 15, 2014 and entitled "Real-Time Face Detection Using Pixel Pairs," which is incorporate by reference herein in its entirety. Where more than one of the RGB cameras 310 can be used individually to capture an entire area of the background 302 that is of interest, selection of the background camera may be based on at least a background camera selected for the previous frame or which of the more than one RGB cameras 310 is more centrally positioned. In some implementations, semantic labeling/segmentation may be used to identify background objects of interest that are preferentially shown an arranged in a background image for use in generating a composite image.

In some circumstances, none of the RGB cameras 310 can individually capture an entire area of the background 302 that is of interest. In such circumstances, the background camera selector 350 may select multiple background cameras, such that the current RGB images 314 captured by the selected background cameras include, as a whole, image data for all or most of an area of the background 302 that is of interest. Then, that image data may be stitched together to generate a background image for the composite image 362. It is noted that in some implementations, two or more of the factors described above for selection of a background camera may be combined, such as by a weighted combination of the factors, to select one or more background cameras. Techniques for stitching together images are discussed in U.S. Patent Application Publication Number 2015/0131924, published on May 14, 2015 and entitled "Creation of Rectangular Images from Input Images" and U.S. Patent Application Publication Number 2013/0129227, published on May 23, 2013 and entitled "Environment and/or Target Segmentation", each of which are incorporated by reference herein in their entireties.

The video capture system 300 includes a background image generator 355 configured to receive the one or more current RGB images 314 corresponding to the background cameras selected by the background camera selector 350, and generate a background image from the received current RGB images 314. Where multiple background cameras have been selected, selected portions of the respective current RGB images 314 are combined, such as by panoramic stitching, to generate the background image. In some implementations, if a portion of an area of the background 302 is not captured in the one or more current RGB images 314 corresponding to the background cameras, corresponding RGB image data from one or more previously captured RGB images may be retrieved from the image store 320. In some examples, RGB image data, such as a current RGB image 314 or the combined image described above, may be cropped and/or resized to generate the background image at a target size.

In some implementations, the background image generator 355 may selectively not use the current RGB images 314 to generate the background image for the current frame. In some examples, a user may specify a static image for use as the background image, and, in response to a user instruction, the background image generator 355 will selectively use the specified static image, or a portion thereof, as the generated background image. Similarly, a user may specify a video as a source for background images, and, in response to a user instruction, the background image generator 355 will selectively use frames from the specified video to generate the background image. In some examples, in response to a user instruction to "freeze" the background image, the background image generator 355 will selectively reuse a background image generated for a previous frame until a user instruction to "unfreeze" is received. In some examples, the background image generator 355 may, in response to a user instruction, selectively switch between displaying an image of the background 302 generated from the current RGB images 314 and an image of application program interface, such as, but not limited to, an electronic whiteboard, a slide presentation program, a file viewer, a spreadsheet program, a word processor program, a web browser, and/or a CAD (computer assisted drawing) program.

The video capture system 300 includes an image compositor 360 configured to generate a composite image for frame image 362, in which one or more foreground images generated by the foreground image generator 345 for a current frame are composited with a background image, such as a background image received from the background image generator 355 for the current frame image 362. A position of each foreground image may be automatically determined by the image compositor 360. For example, as a view of a foreground subject is typically cut off at the bottom of a foreground image, due to a lower portion of the foreground subject being outside of the FOV of the corresponding RGB camera 310, the foreground image may automatically be positioned along a bottom edge of the composite image 362. In some implementations, the image compositor 360 may determine a lateral position of a foreground image in the composite image 362 based on at least a position of a foreground image for the same foreground subject in one or more composite images for previous frames. For example, foreground images for a first foreground subject may remain in a consistent position as foreground images for other subjects are added and/or removed from the composite image 362 over time. In some implementations, a user may specify a position at, and/or an area within, which a foreground image appears in the composite image.

In some implementations, alpha blending (for example, a linear alpha blending performed on the foreground image before it is composited, or as part of compositing) or blur (for example, a Gaussian blur) is performed along an edge of a foreground image to reduce an effect of background pixels being included in the foreground image due to an overinclusive image segmentation. In some examples, if a bottom edge of a foreground image is not positioned at a bottom edge of the composited image 362, a more gradual alpha blending may be performed along the bottom edge of the foreground than is performed for other edges of the foreground image.

It is noted that in the event that the foreground subject locator 330 does not identify any foreground subject for the current frame, a background image generated by the background image generator 355 for the current frame may be used for the frame image 362 (as indicated by a dashed arrow between background image generator 355 and frame image 362 in FIG. 3).

In some implementations, the video capture system 300 includes an image/video encoder 365 that encodes the frame image 362 as part of a series of frame images in a video stream. In some implementations, the video capture system 300 includes a video conferencing module 370 that is configured to establish and/or participate in a video conferencing session via network(s) 390 with one or more remote systems, such as remote display system 380 at a geographic location 384. The network(s) 390 may include, for example, one or more wired or wireless data communication networks, and/or the Internet. The video conferencing module 370 may be implemented as an application program executed by the video capture system 300. In some implementations, the video capture system 300 may include a virtual webcam module (not illustrated in FIG. 3) configured to appear as a webcam or other video camera to application programs, including, for example, the video conferencing module 370. Accordingly, via the virtual webcam module, the frame images 362 (including composite images generated by the image compositor 360) may be used by conventional video conferencing application programs. By transmitting a video stream encoded by the image/video encoder 365 to the remote system 380 for a video conferencing session, the video capture system 300 causes the frame image 362, and other such frame images generated by the video capture system 300, to be displayed to a remote participant 382 on a display unit 385 included in the remote display system 380. In some examples, the video capture system 300 may be configured to interact with one or more external services 375 via the network(s) 390. For example, an external service 375 may be used to establish video conferencing sessions between the video capture system 300 and other remote systems.

Although FIG. 3 illustrates various operations being performed by the video capture system 300, in different implementations, some of the described operations are performed by other systems, such as external services 375 and/or the remote participant system 380. In some examples, the external services 375 may include all or part of the image storage 320, depth image segmenter 325, foreground subject locator 330, foreground camera selector 335, foreground segmenter 340, foreground image generator 345, background camera selector 350, background image generator 355, image compositor 360, image/video encoder 365, and/or video conferencing module 370. In some examples, the remote participant system 380 may include all or part of the image compositor 360, and be configured to receive separate background images and foreground images for compositing by the remote participant system. In some implementations, new background images may be generated at a lower frame rate than new foreground images. For example, foreground images may be generated at a first frame rate of 30 Hz and backgrounds images may be generated at a second frame rate that is half the first frame rate (15 Hz). This allows for a reduction in bandwidth used to transmit background image data, and a reduction in processing performed to generate and process background images.

For the drawings in FIGS. 4A-9D, the display screen 105 has a 16:9 aspect ratio, with a diagonal size of approximately 213 centimeters. The RGB cameras 110*a*, 110*b*, 110*c*, and 110*d* are positioned equidistantly along a line substantially parallel to the lateral axis 230 with a distance of about 150 centimeters between the optical axes of the RGB cameras 110*a* and 110*d*. A lateral midline of the display screen 105 (for example, the lateral midline 206 illustrated in FIG. 2) is positioned horizontally and approximately 137 centimeters above a floor, and the optical axes of the RGB cameras 110 are positioned approximately 23 centimeters above the vertical center of the display screen 105, placing the optical axes of the RGB cameras 110 approximately 160 centimeters from the floor, placing them at approximately eye level for a standing human subject. By positioning the RGB cameras 110 at an eye-level height, a subject's eyes are more likely to be aligned with the RGB cameras 110. An optical axis of the depth camera 115*a* is oriented 1 degree up and 11 degrees left from the horizontal axis 210 and an optical axis of the depth camera 115*b* is oriented 1 degree up and 11 degrees right from the horizontal axis 210, thereby providing an increased combined FOV for the depth cameras 115. An optical center of the depth camera 115*a* is positioned approximately 66 centimeters in the lateral direction from an optical center of the depth camera 215*b*. The optical centers of the depth cameras 115 are positioned approximately 13 centimeters below the optical axes of the RGB cameras 110. The RGB cameras 110 and the depth cameras 115 each capture images with a 16:9 aspect ratio and with a horizontal FOV of approximately 100 degrees. These dimensions and arrangements are described to more fully describe the illustrations in FIGS. 4A-9D, and are not required features of the examples described herein.

Figure 4A:
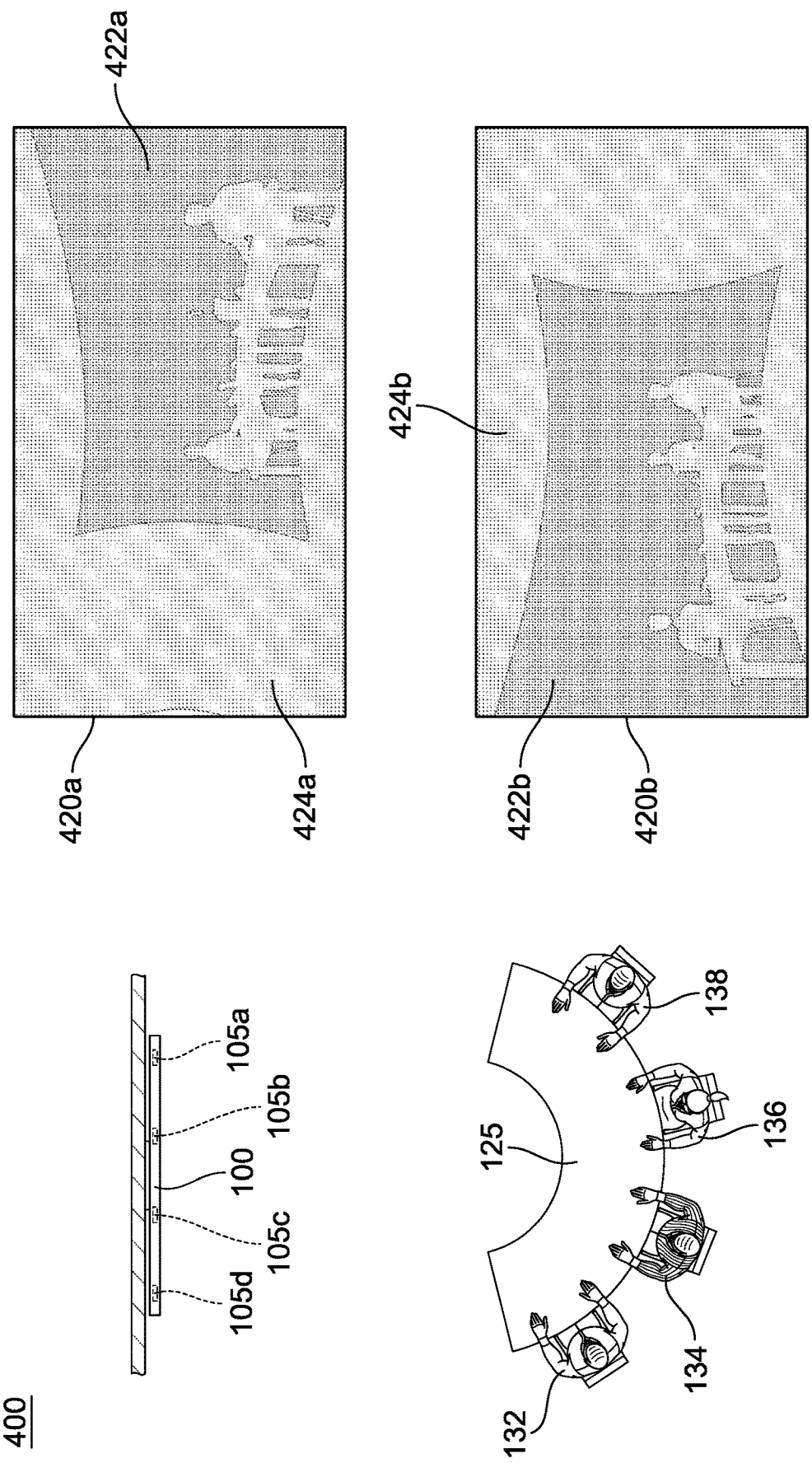
FIG. 4A illustrates an example of a top view of a scene in which participants are all seated at a table during a video conferencing session.
Figure 4B:
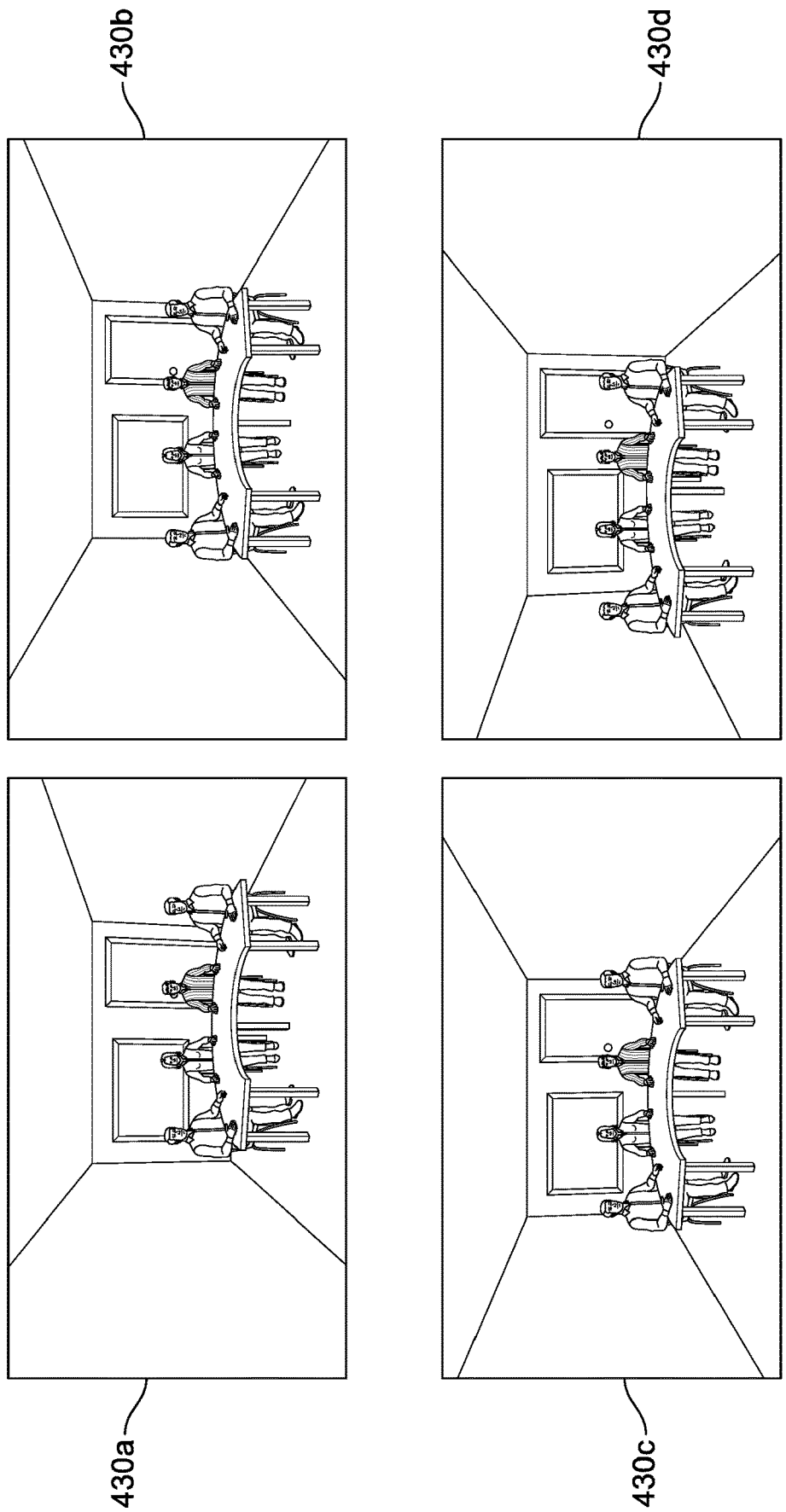
FIG. 4B illustrates an example of RGB images captured by the video capture system for the scene in FIG. 4A.

FIG. 4A illustrates a top view of an example scene 400 in which the four participants 132, 134, 136, and 138 shown in FIG. 1 are all seated at a table 125 during a video conferencing session conducted via the video capture system 100 illustrated in FIGS. 1 and 2, and further illustrates depth images 420*a* and 420*b* captured by the video capture system 100 for the scene 400. FIG. 4B illustrates RGB images 430*a*, 430*b*, 430*c*, and 430*c* captured by the video capture system 100 for the scene 400. The depth images 420*a* and 420*b* have been captured by respective depth cameras 115*a* and 115*b* for the scene 400. Due to limitations of patent illustrations, depth images illustrated in FIGS. 4A, 5A, 6A, 7A, 8A, and 9A are illustrated with only a few different levels of shading. The darkest level of shading, seen in areas 422*a* and 422*b*, for example, corresponds to depth estimates of about 3.5 meters or more. A second level of shading, seen in areas 424*a* and 424*b*, for example, corresponds to depth estimates within a range of about 2.1 meters to about 3.5 meters. Depth estimates within that range are illustrated for a portion of the desk 125, silhouettes of the participants 132 and 138, portions of the participants 134 and 136, walls on left and right sides of the conference room for scene 400, and a ceiling of the conference room. None of the depth estimates in the first and second depth images 420*a* and 420*b* are less than the about 2 meters for that range. The RGB images 430*a*, 430*b*, 430*c*, and 430*d* have been captured by respective RGB cameras 110*a*, 110*b*, 110*c*, and 110*d* for the scene 400. In each of the RGB images 430*a*, 430*b*, 430*c*, and 430*d*, the table 125, the participants 132, 134, 136, and 138, and various features of the conference room are visible.

For the scene 400 in FIGS. 4A and 4B, the depth image segmenter 325 does not identify any foreground portions for the depth images 420*a* and 420*b*, and no foreground subjects are identified by the foreground subject locator 330. The RGB camera 110*c* is selected as a background camera by the background camera selector 350, based on no foreground subjects having been identified and the RGB camera 110*c* having a central position. A frame image is generated for the scene 400 from the RGB image 430*c* without a composited foreground image.

Figure 5B:
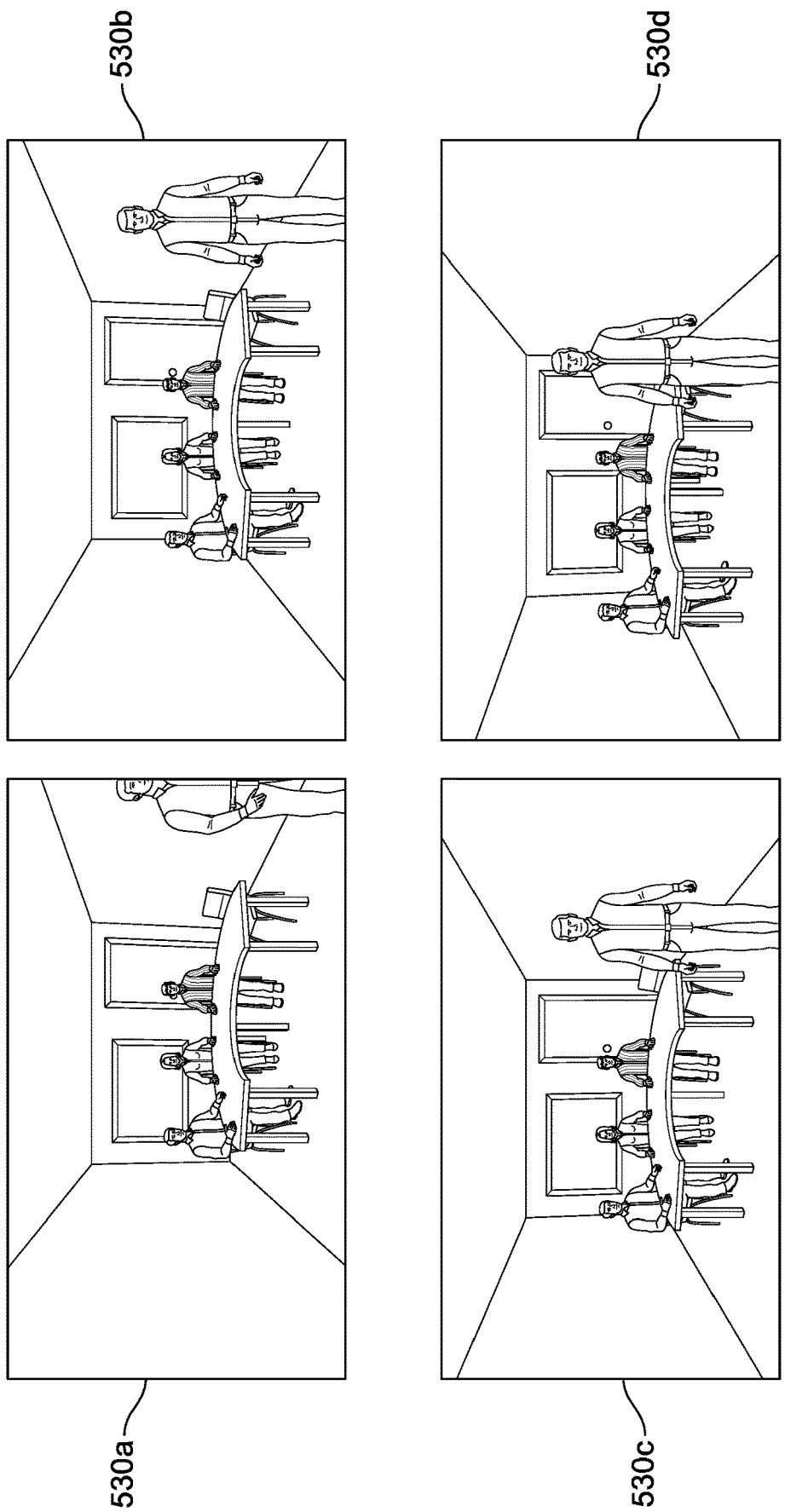
FIG. 5B illustrates an example of RGB images captured by the video capture system for the scene in FIG. 5A.

FIG. 5A illustrates a top view of an example scene 500 during the video conferencing session described for FIGS. 4A and 4B, and in which a standing participant 132 has advanced closer to the video capture system 100, and further illustrates depth images 520*a* and 520*b* captured by the video capture system 100 for the scene 500. FIG. 5B illustrates RGB images 530*a*, 530*b*, 530*c*, and 530*c* captured by the video capture system 100 for the scene 500. The depth images 520*a* and 520*b* have been captured by respective depth cameras 115*a* and 115*b* for the scene 500. The depth image 520*a* is substantially unchanged from the depth image 420*a*. In the depth image 520*b*, depth estimates within the range of about 2 meters to about 2.6 meters for the participant 132 are illustrated in an area 522 of the depth image 520*b*. The RGB images 530*a*, 530*b*, 530*c*, and 530*d* have been captured by respective RGB cameras 110*a*, 110*b*, 110*c*, and 110*d* for the scene 500, and reflect the new position of the participant 132.

FIG. 5A illustrates an extent of an example threshold distance 510 and an example foreground space 515 for the video capture system 100, either of which may be used by the depth image segmenter 325 and/or the foreground subject locator 330. In the scene 500, although the participant 132 has advanced closer to the video capture system 100, the depth estimates corresponding to the participant 132, in areas 522 of the depth image 520*b*, are greater than the threshold distance 510, and the participant 132 remains outside of the foreground space 515. The shapes, positions, and distances illustrated in FIG. 5A for the threshold distance 510 and the foreground space 515 are generally illustrated for discussion, and may be different in various implementations. In some implementations, the threshold distance 510 and/or a shape of, and positions for, the foreground space 515 may be defined and/or adjusted by a user; for example, during a setup process.

For the scene 500 in FIGS. 5A and 5B, the depth image segmenter 325 does not identify any foreground portions for the depth images 520*a* and 520*b*, and no foreground subjects are identified by the foreground subject locator 330. The RGB camera 110*c* is again selected as a background camera by the background camera selector 350, based on no foreground subjects having been identified and the RGB camera 110*c* having a central position and/or RGB camera 110*c* having been previously selected as the background camera. As with the scene 400, a frame image is generated for the scene 500 from the RGB image 530*c* without a composited foreground image.

Figure 6A:
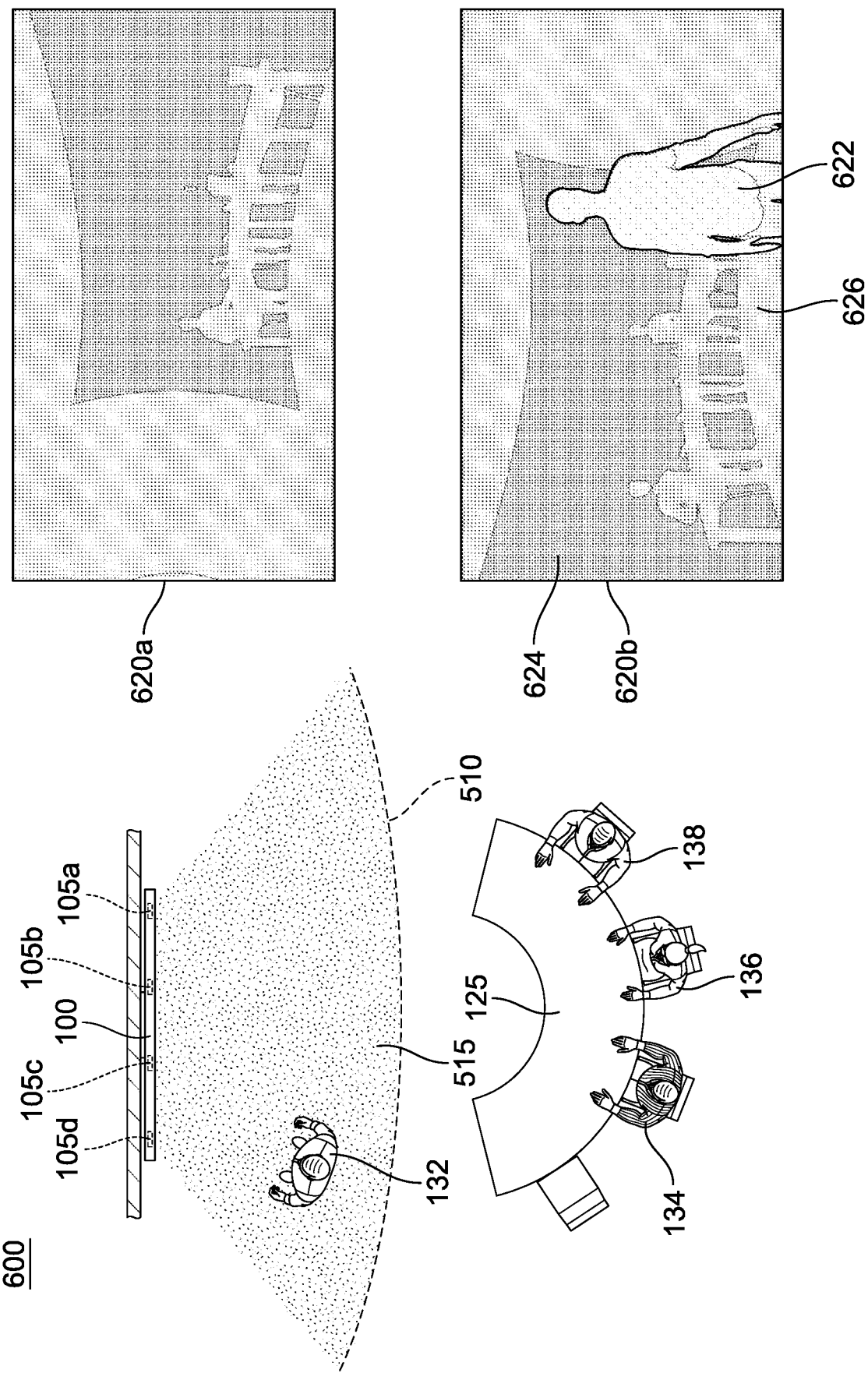
FIG. 6A illustrates an example of a top view of a scene during the video conferencing session described for FIGS. 4A-5B.
Figure 6B:
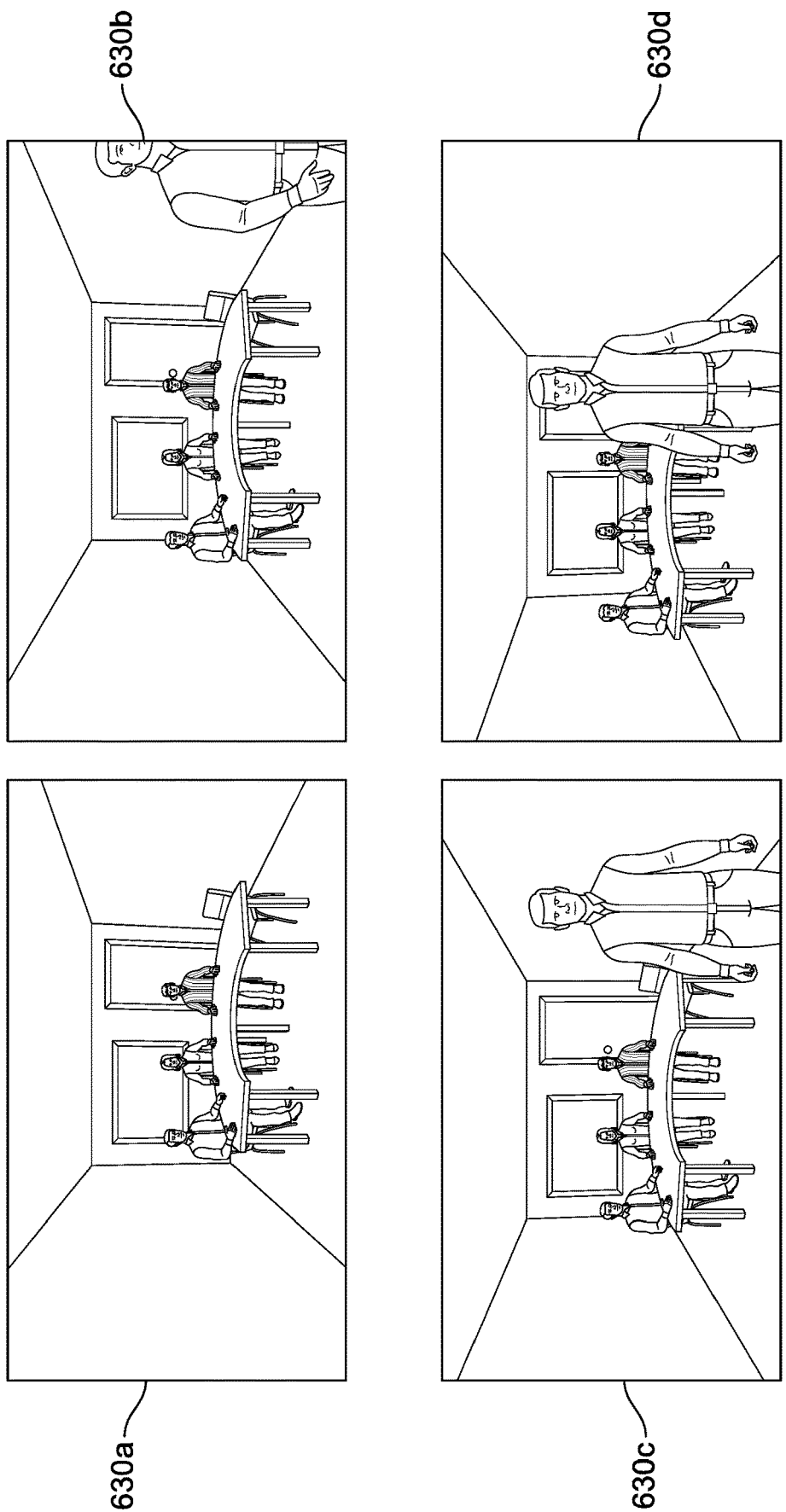
FIG. 6B illustrates an example of RGB images captured by the video capture system for the scene in FIG. 6A.

FIG. 6A illustrates a top view of an example scene 600 during the video conferencing session described for FIGS. 4A-5B, and in which the standing participant 132 has advanced further toward the video capture system 100, and further illustrates depth images 620*a* and 620*b* captured by the video capture system 100 for the scene 600. FIG. 6B illustrates RGB images 630*a*, 630*b*, 630*c*, and 630*c* captured by the video capture system 100 for the scene 600. The depth images 620*a* and 620*b* have been captured by respective depth cameras 115*a* and 115*b* for the scene 600. The depth image 620*a* is substantially unchanged from the depth image 520*a*. In the depth image 620*b*, there is a portion 622 with depth estimates that are substantially discontinuous along edges between the portion 622 and surrounding areas of the depth image 620*b* such as areas 624 and 626. The RGB images 630*a*, 630*b*, 630*c*, and 630*d* have been captured by respective RGB cameras 110a, 110b, 110c, and 110d for the scene 600, and reflect the new position of the participant 132.

In the scene 600, the participant 132 has advanced well within the threshold distance 510 and the foreground space 515. Based on the above-mentioned discontinuities between the portion 622 and surrounding areas of the depth image 620b, the depth image segmenter 325 identifies the portion 622 as a foreground portion 622 of the depth image 620b. In some examples, the depth image segmenter 325 may further determine a distance and/or position for the identified foreground portion 622. Based on, for example, the determined distance being less than the threshold distance 510 and/or the determined position being within the foreground space 515, foreground subject locator 330 identifies a foreground subject corresponding to the participant 132. In FIGS. 5A-9D, the participant 132 may also be referred to as "foreground subject 132" or "foreground human subject 132." As a result of the determination that there is a foreground subject 132, a composited frame image will be generated for the scene 600.

Figure 6C:
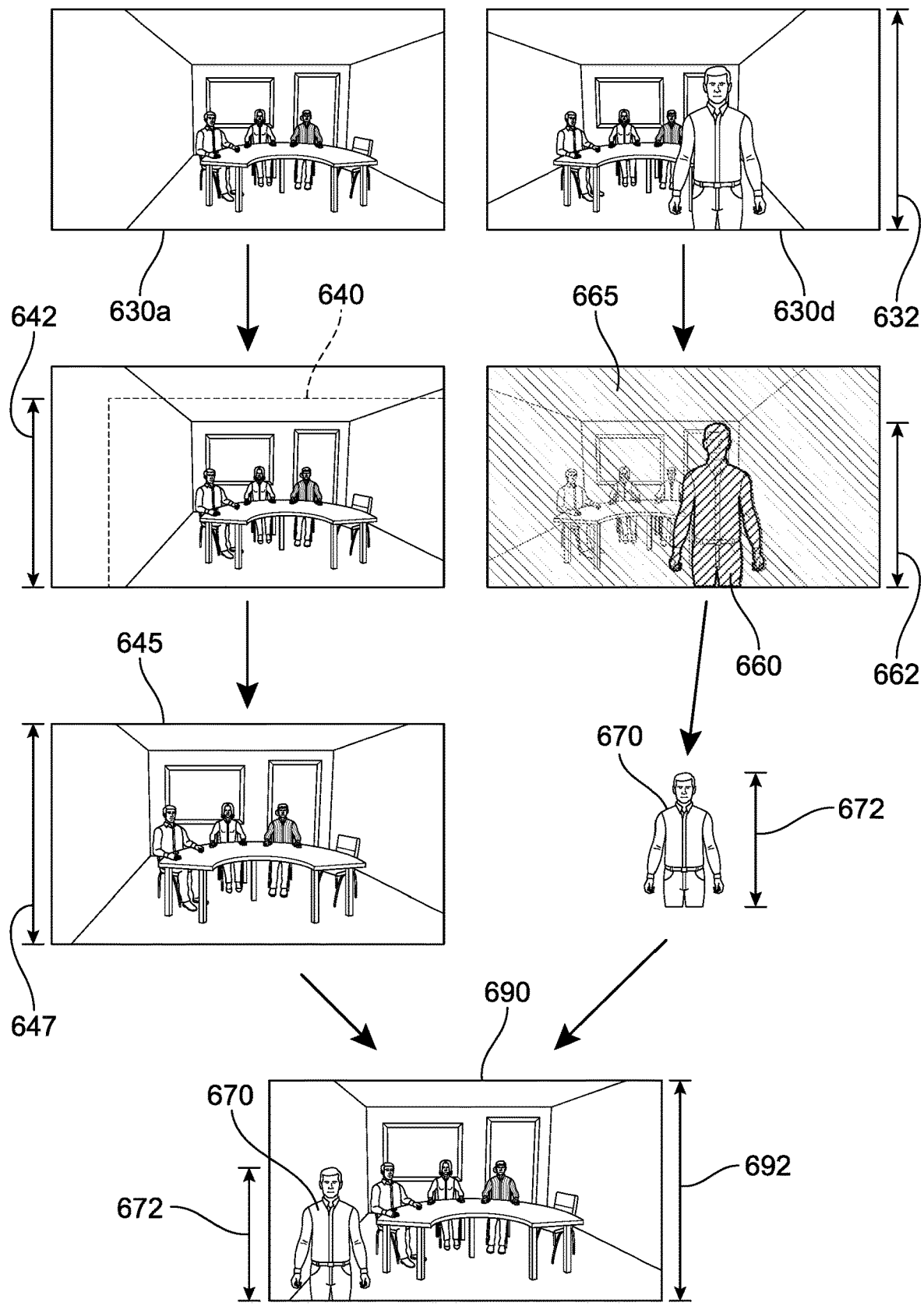
FIG. 6C illustrates an example of a background image and a foreground image that are used to generate a composite image.

FIG. 6C illustrates an example of in which a background image 645 and a foreground image 670 are generated and used to generate a composite image 690 for the scene 600 illustrated in FIGS. 6A and 6B. For the foreground subject 132, the foreground camera selector 335 selects the RGB camera 110d as the foreground camera. Although the foreground subject 132 is laterally fully within the FOVs of both RGB cameras 110c and 110d, as can be seen in RGB images 630c and 630d, the foreground camera selector 335 may select the RGB camera 110d based on, for example, a gaze of the foreground subject 132 being oriented more toward the RGB camera 110d and/or the foreground subject 132 being closer to a center of the FOV of the RGB camera 110d, and accordingly being less distorted in RGB image 630d than in RGB image 630c. The RGB image 630d captured by the selected foreground camera is received by the foreground segmenter 340, which, for the foreground subject 132, segments the RGB image 630d to identify a foreground portion 660 of the RGB image 630d (for example, by discriminating pixels included in the foreground portion 660 from background pixels 665). The segmentation may be performed based on an identification of pixels in the RGB image 630d that correspond to depth estimates included within the foreground portion 622 of the depth image 620b. The foreground image generator 345 generates a foreground image 670 for the foreground subject 132 by resizing (for example, using a proportional scaling) the foreground portion 660 from a total height 662 to a reduced total height 672.

The background camera selector selects the RGB camera 110a as the only background camera for the scene 600. For example, the RGB camera 110a may be selected based on at least the RGB camera 110a having previously been selected as the background camera. Accordingly, the background image generator 355 uses the RGB image 110a captured by the selected background camera to generate a background image 645 for the scene 600. In this particular example, the background image generator 335 identifies a subportion 640 (with a height 642) of the original RGB image 630a, and scales the subportion 640 to a target height 647 for use as the background image 645. Such use of a subportion of an original RGB image may be performed to increase a size of a background area that is of interest (for example, an area including the table 125 or an area including the faces of the seated participants 134, 136, and 138), and which may be smaller than desired due to the RGB camera 110a being a wide angle camera. Such use of a subportion of an original RGB image may be performed to position background image elements (for example, detected faces) such that they remain visible after one or more foreground images and the background image are composited together.

For the scene 600, the image compositor 360 generate a composite frame image 690 from the foreground image 670 and the background image 645. In FIG. 6C, the total height 662 of the foreground portion 660 is a first percentage (approximately 74%) of the total height 632 of the RGB image 630d. The total height 672 of the foreground image 670 in the composite image 690 is a second percentage (approximately 60%) of the total height 692 of the composite image 692, which is substantially smaller than the first percentage. In this particular example, much as described for the composite image 145 in FIG. 1, the lateral position of the foreground image 670 in the composite image 690 does not correspond to the actual physical arrangement of the foreground subject 132 in the scene 600.

Figure 7A:
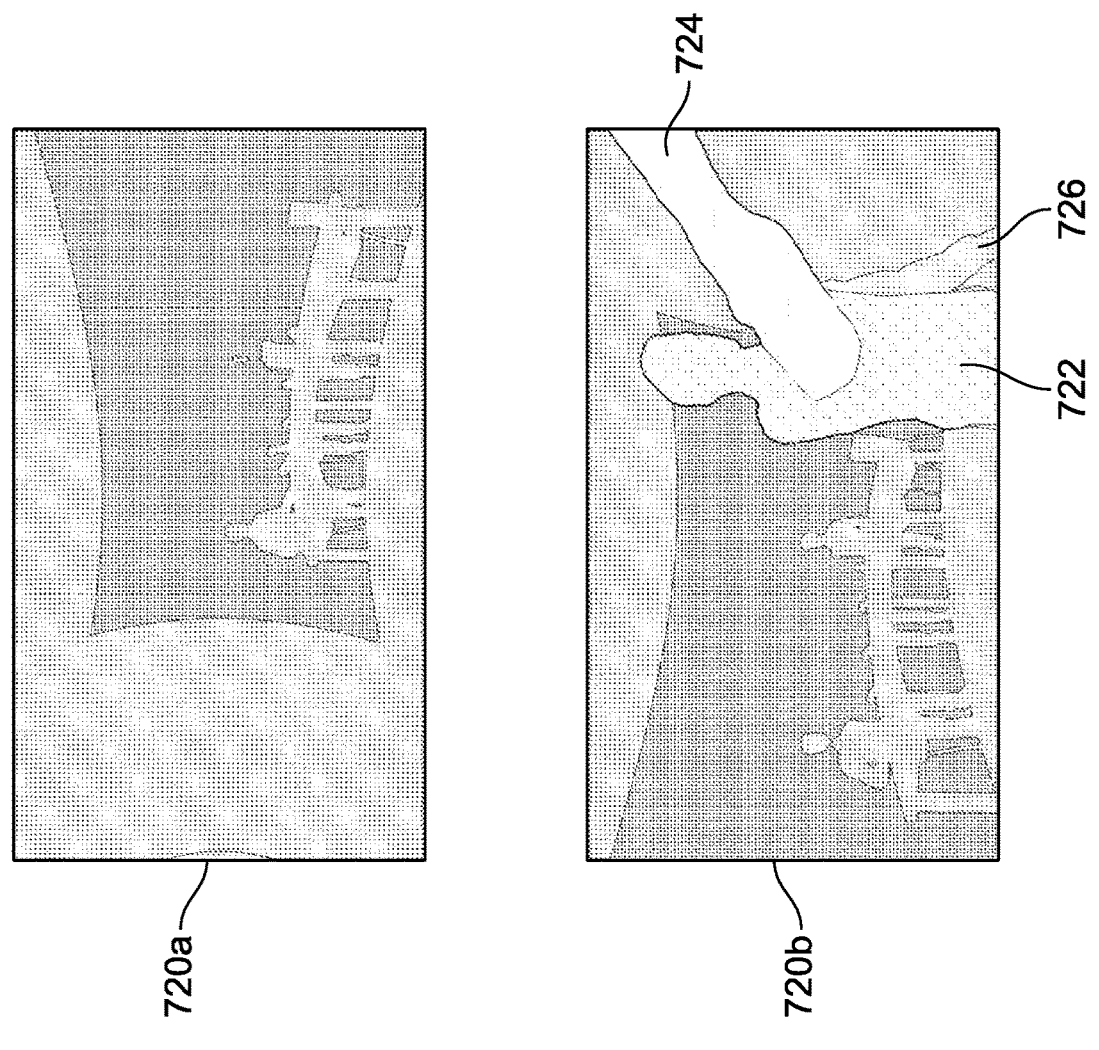
FIG. 7A illustrates an example of a top view of a scene during the video conferencing session described for FIGS. 4A-6C.
Figure 7A:
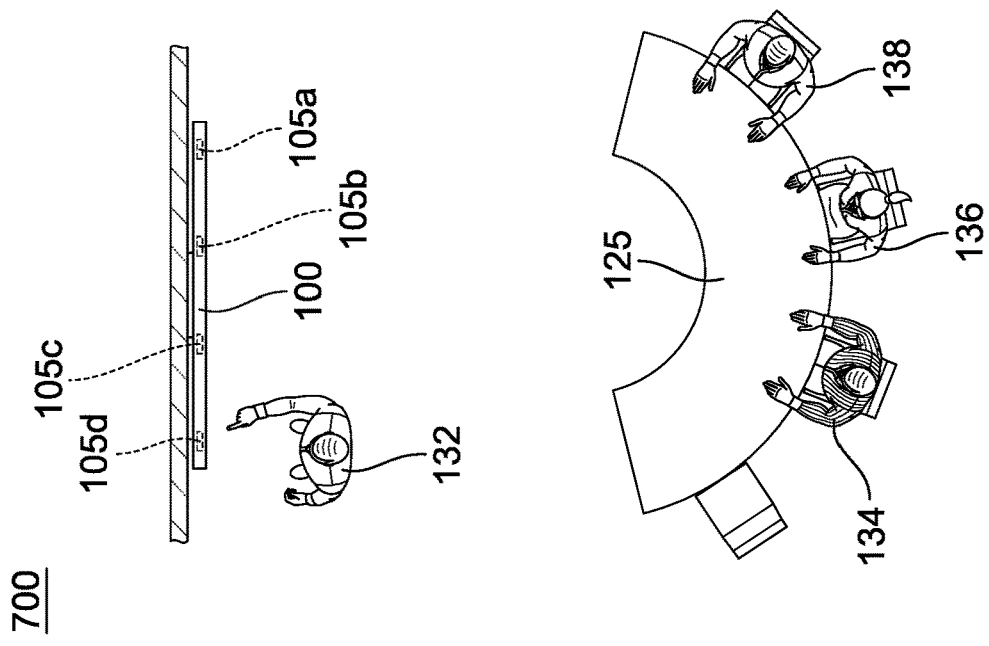
Figure 7B:
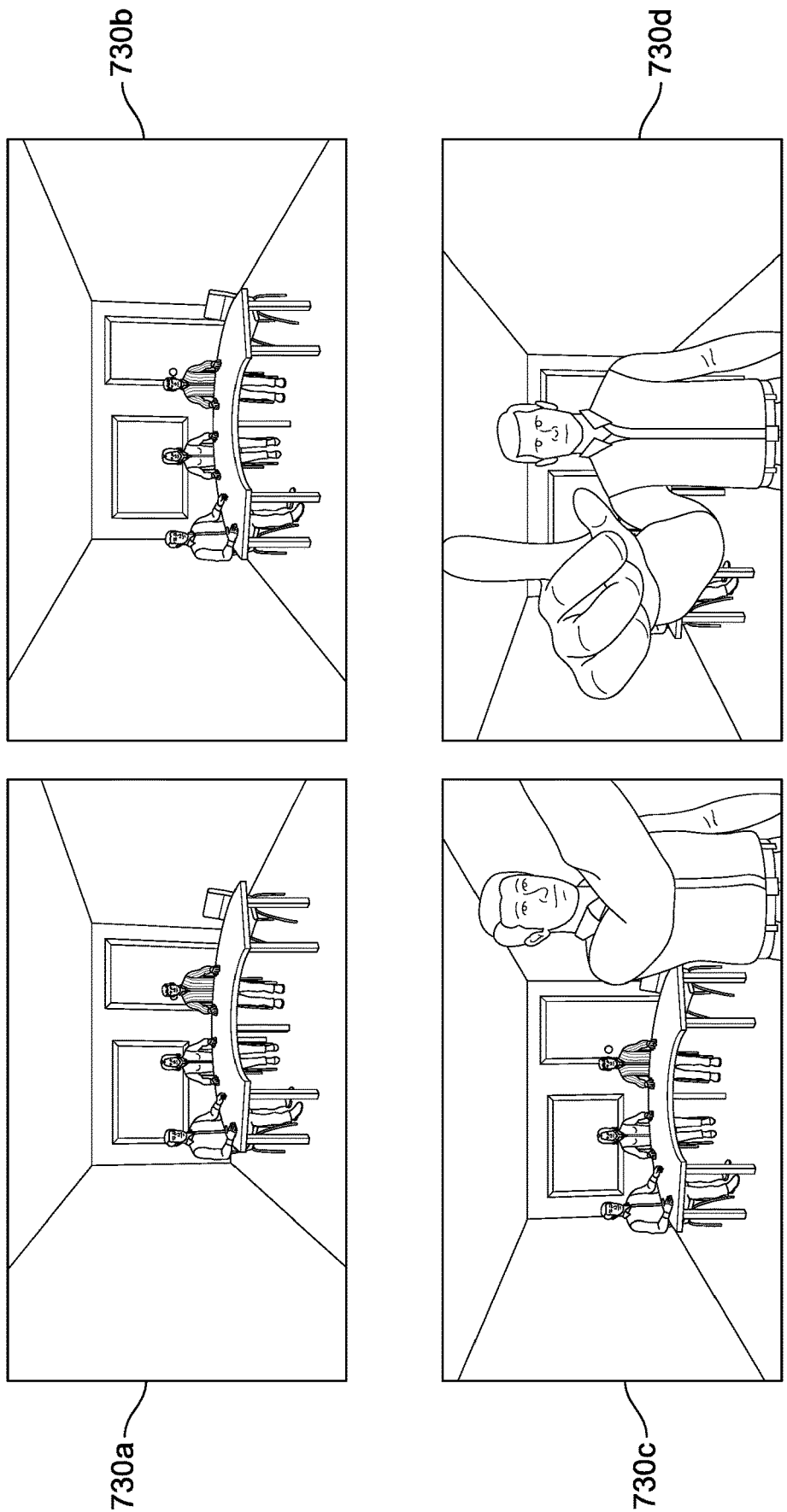
FIG. 7B illustrates an example of RGB images captured by the video capture system for the scene in FIG. 7A.

FIG. 7A illustrates a top view of an example scene 700 during the video conferencing session described for FIGS. 4A-6C, in which the standing participant 132 is in very close proximity to the video capture system 100, and further illustrates depth images 720a and 720b captured by the video capture system 100 for the scene 700. FIG. 7B illustrates RGB images 730a, 730b, 730c, and 730c captured by the video capture system 100 for the scene 700. The depth images 720a and 720b have been captured by respective depth cameras 115a and 115b for the scene 700. The depth image 720a is substantially unchanged from the depth image 620a. In the depth image 720b, there is a portion 722, including subportions 724 and 726, with depth estimates that are substantially discontinuous along edges between the portion 722 and surrounding areas of the depth image 720b, much as discussed for depth image 620b in FIG. 6A. The RGB images 730a, 730b, 730c, and 730d have been captured by respective RGB cameras 110a, 110b, 110c, and 110d for the scene 700, and reflect the new position of the participant 132 in the scene 700.

Figure 7C:
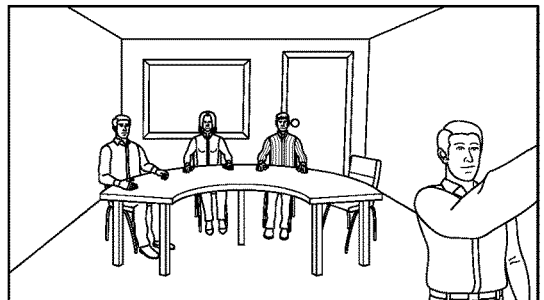
FIG. 7C illustrates various approaches for generating a composite image for the scene illustrated in FIGS. 7A and 7B.
Figure 7C:
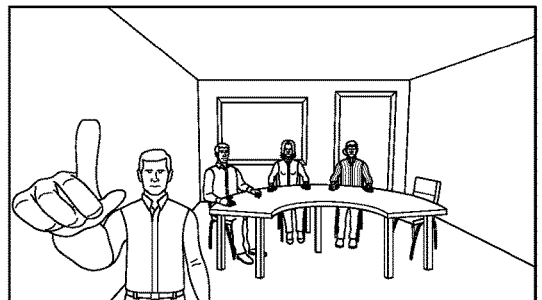
Figure 7C:
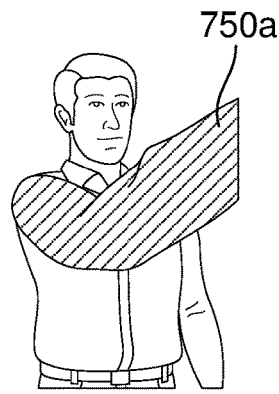
Figure 7C:
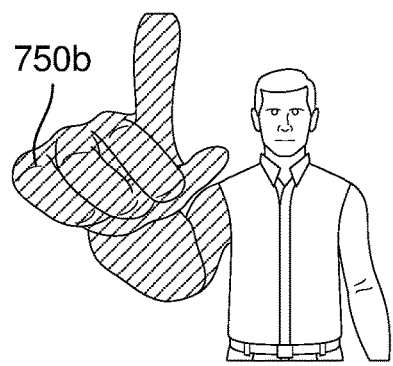
Figure 7C:
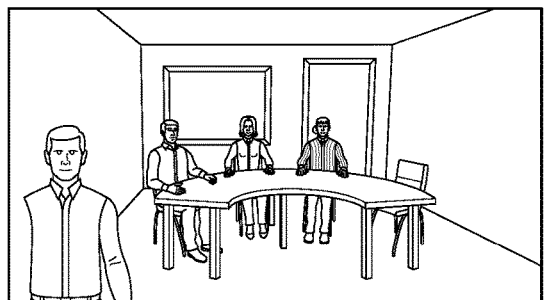
Figure 7C:
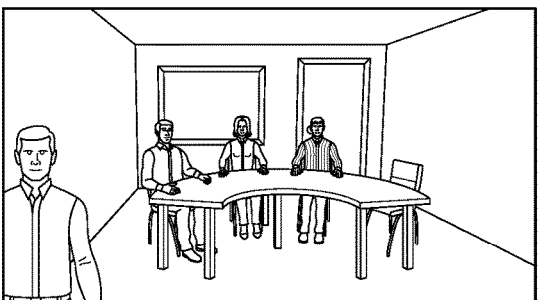

FIG. 7C illustrates various approaches for generating a composite image for the scene 700 illustrated in FIGS. 7A and 7B. Although a composite image may be generated for the scene 700 much as described above for the scene 600 in FIGS. 6A-6C, the resulting composite image might be along the lines of composite image 740a (in which the foreground image may abruptly change from the left side to the right side, a background image is substantially changed to accommodate the foreground image being moved to the right, an arm 750a in the foreground image is out of proportion, and the foreground subject is not oriented toward the foreground camera) or composite image 740b (in which an area of interest in the background has been reduced in size to accommodate a wider foreground image, and an arm 750b in the foreground image is significantly out of proportion). Solutions offering improved results include, but are not limited to, removing a disproportionate portion of the foreground image as illustrated in composite image 760a (in which the arm 750b has been removed) and repositioning the foreground image to crop out a disproportionate portion of the foreground image as illustrated in composite image 760b. In some implementations, interactive user interface elements responsive to touch-based user input are presented in portions of the display screen 105 likely to reduce the occurrence of images with such disproportionate portions. For example, interactive user interface elements may be positioned at or near the right or left ends of a display screen 105 configured to operate as a touch screen to receive user input, such that input via a finger or handheld instrument is more likely to occur at positions away from an optical axis of an RGB camera 110 (including, for example, positions outside of an FOV of the RGB camera 110). In some examples, such interactive user interface elements may be dynamically positioned and/or repositioned based on at least a detected position of a foreground subject. For example, an interactive user interface element may be moved from a left end to a right end in response to a corresponding lateral movement of a foreground subject. As another example, the dynamic positioning and/or repositioning may include selecting one of multiple areas of the display screen 105 where touch-based input occurs away from optical axes of one or more of the RGB cameras 110. In some examples, a hand or limb likely to be used for touch-based input may be determined for a foreground subject (for example, a determination of a dominant hand based on on past user input events), and dynamic positioning or repositioning is performed based on which hand is determined to be dominant. For example, positions to the left (as viewed by a user looking at the display screen) of a foreground camera may be preferred to avoid a left-handed foreground subject reaching across an FOV of the foreground camera. In some examples, a user interface may be selectively positioned to place a display area of the user interface closer than an input portion of the user interface to an optical axis of an RGB camera 110, thereby guiding a foreground subject's gaze toward the RGB camera 110, while also guiding the foreground subject's input interactions away from the RGB camera 110.

Figure 8B:
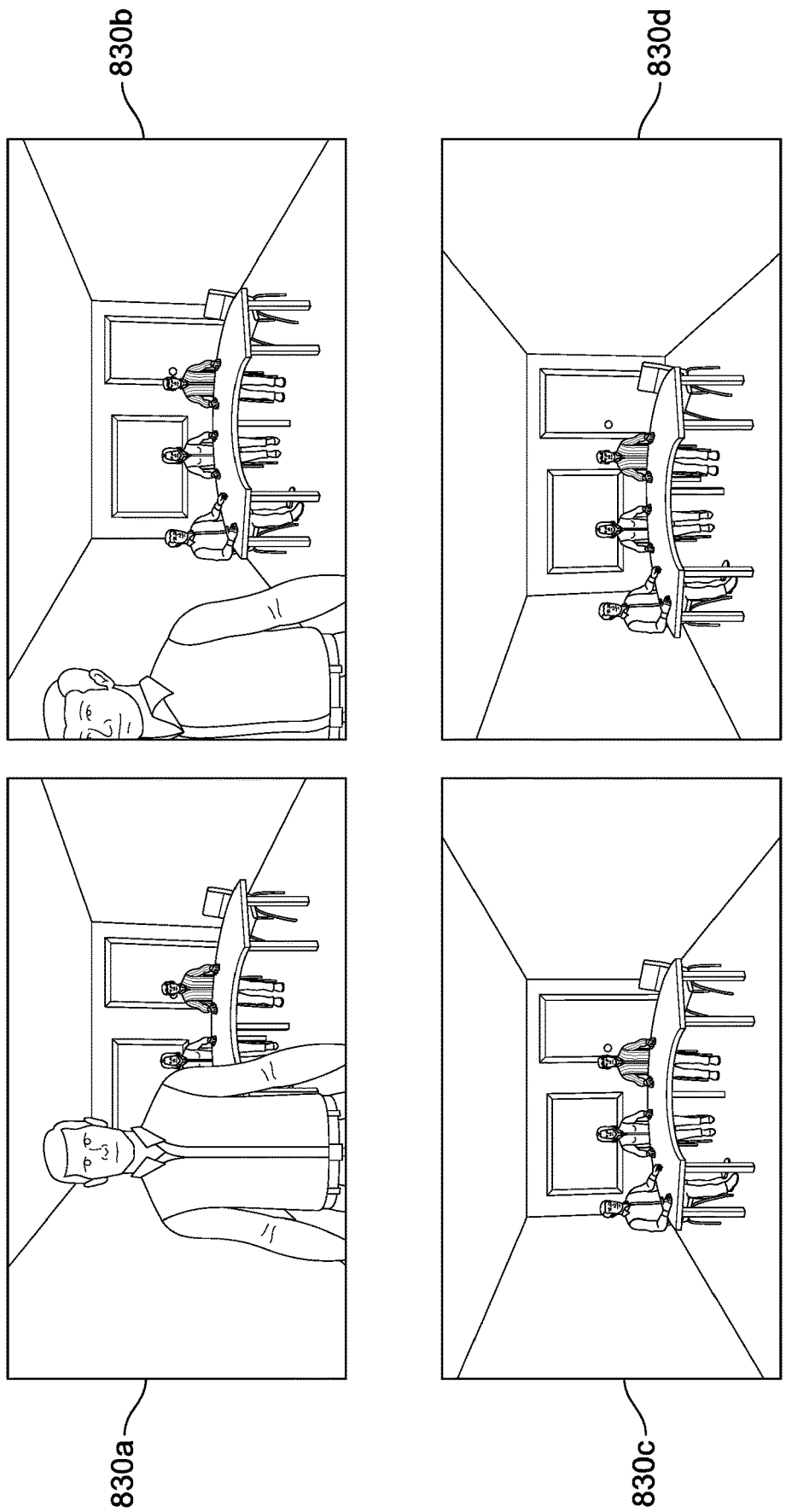
FIG. 8B illustrates an example of RGB images captured by the video capture system for the scene in FIG. 8A.

FIG. 8A illustrates a top view of an example scene 800 during the video conferencing session described for FIGS. 4A-7C, in which the standing participant 132 is in generally close proximity to the video capture system 100, and has moved laterally across and in front of the video capture system 100. In other words, the standing participant 132 has moved from a left side of the video capture system 100 (as viewed from above) to a right side of the video capture system 100. FIG. 8A further illustrates depth images 820a and 820b captured by the video capture system 100 for the scene 800. FIG. 8B illustrates RGB images 830a, 830b, 830c, and 830c captured by the video capture system 100 for the scene 800. The depth images 820a and 820b have been captured by respective depth cameras 115a and 115b for the scene 800. In the depth image 820a, there is a portion 822 with depth estimates that are substantially discontinuous along edges between the portion 822 and surrounding areas of the depth image 720b, much as discussed for depth image 620b in FIG. 6A. The RGB images 730a, 730b, 730c, and 730d have been captured by respective RGB cameras 110a, 110b, 110c, and 110d for the scene 700, and reflect the new position of the participant 132 in the scene 700. For the scene 800, a composite image is generated using the RGB camera 110a as a foreground camera and the RGB camera 110c as a background camera, much as previously described. From the scene 700, in FIGS. 7A-7C, to the scene 800, the selected foreground and background cameras have changed according to a lateral position of the standing participant 132, such that from the scene 700 to the scene 800, each of the RGB cameras 110 has been selected and used as a foreground camera and each of the RGB cameras 110 has been selected and used as a background camera. This illustrates the effectiveness of each of the RGB cameras 110 for both foreground and background RGB image capture, in accordance with movement of one or more foreground subjects.

Figure 9A:
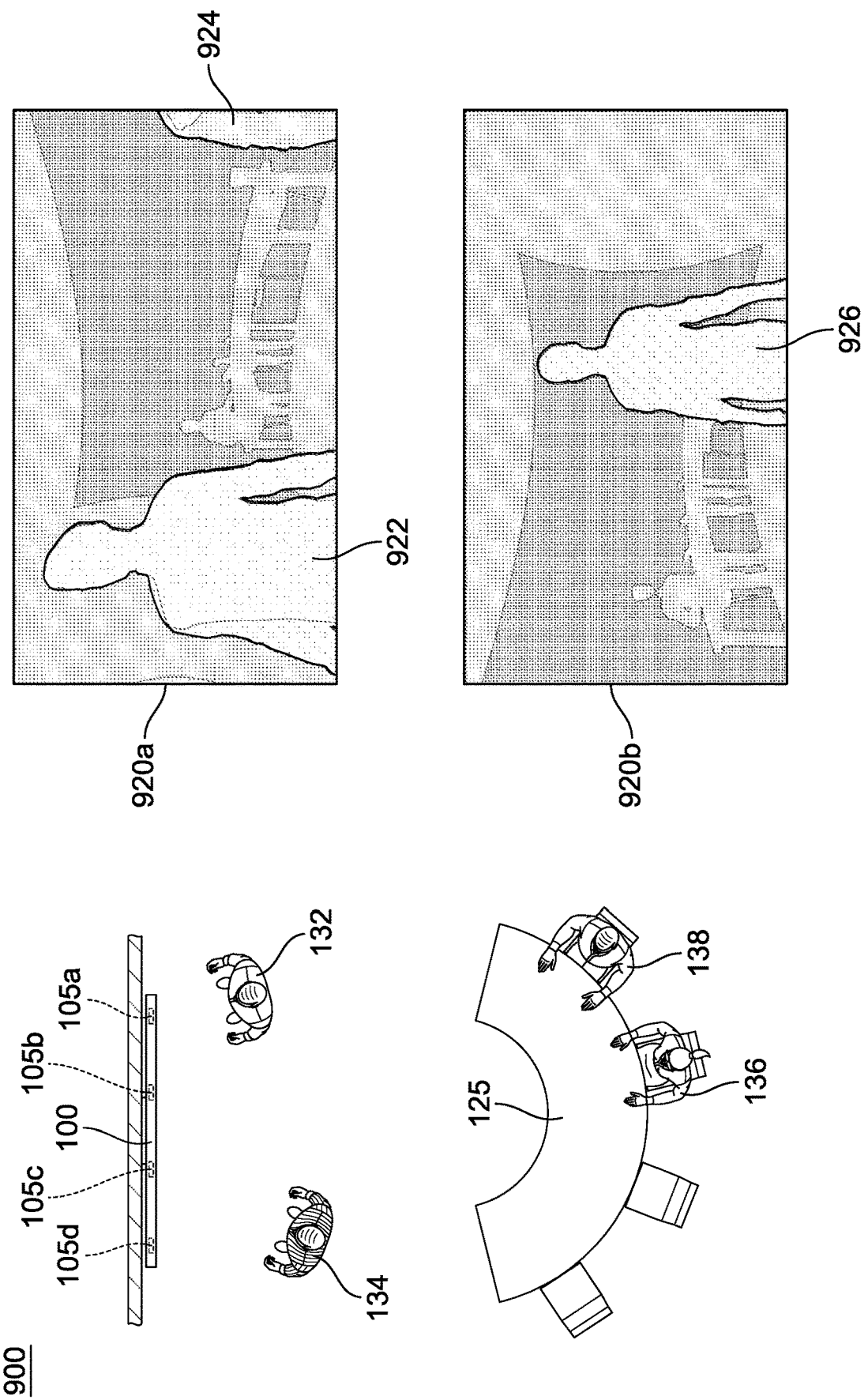
FIG. 9A illustrates an example of a top view of a scene during the video conferencing session described for FIGS. 4A-8B.
Figure 9B:
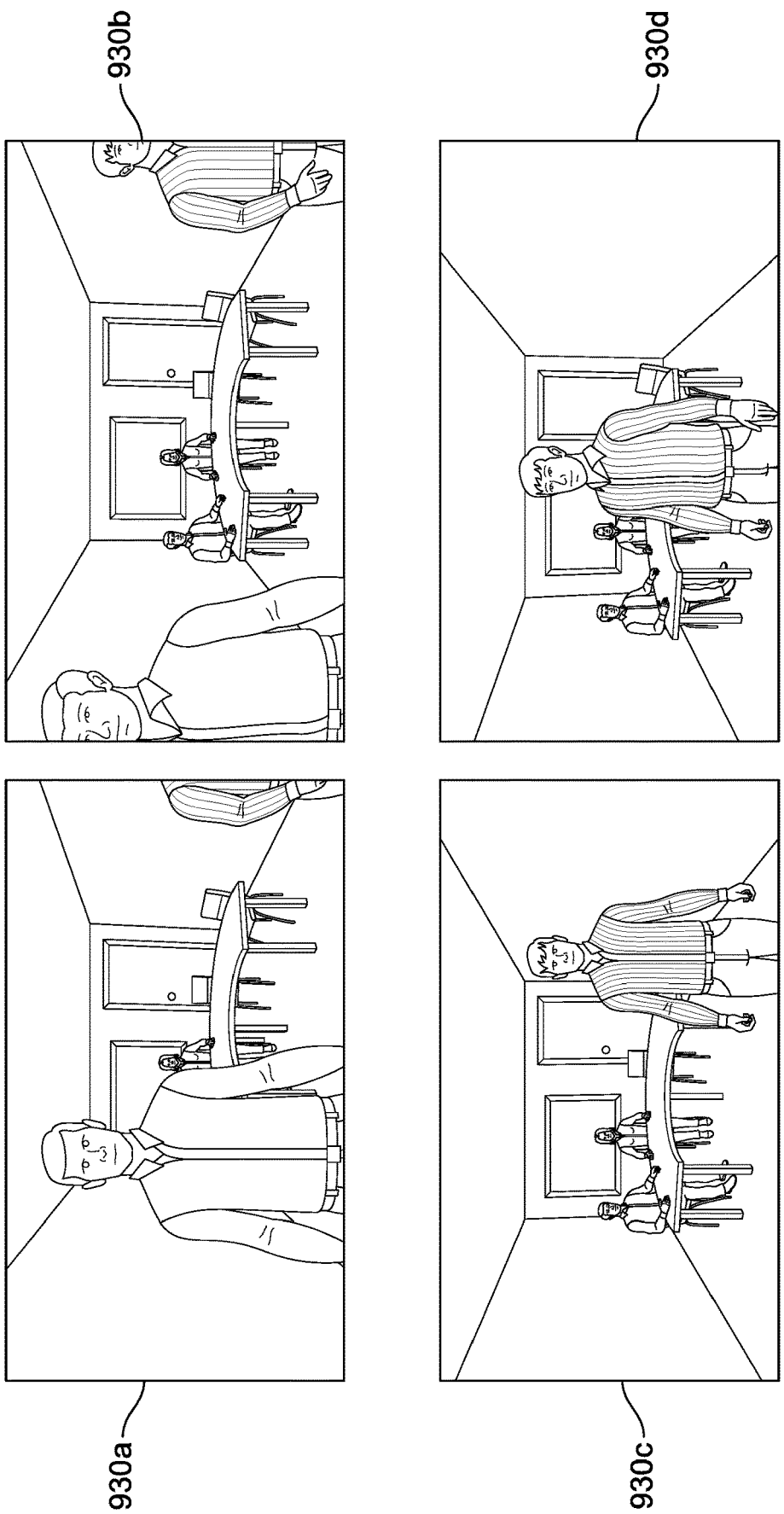
FIG. 9B illustrates an example of RGB images captured by the video capture system for the scene in FIG. 9A.

FIG. 9A illustrates a top view of an example scene 900 during the video conferencing session described for FIGS. 4A-8B, in which another standing participant 134 also stands and walks into proximity to the video capture system 100, and further illustrates depth images 920a and 920b captured by the video capture system 100 for the scene 900. FIG. 9B illustrates RGB images 930a, 930b, 930c, and 930c captured by the video capture system 100 for the scene 900. The depth images 920a and 920b have been captured by respective depth cameras 115a and 115b for the scene 900. The depth image 920a is mostly unchanged from the depth image 820a, except that in addition to a portion 922 corresponding to the participant 132, the depth image 920a further includes a portion 944 corresponding to the participant 134. Both of the portions 922 and 924 have depth estimates that are substantially discontinuous along edges between the portions 922 and 924 and surrounding areas of the depth image 920a. In the depth image 920b, there is a portion 926 with depth estimates that are substantially discontinuous along edges between the portion 926 and surrounding areas of the depth image 920b. The RGB images 930a, 930b, 930c, and 930d have been captured by respective RGB cameras 110a, 110b, 110c, and 110d for the scene 900, and reflect the proximity of the participant 134 to the video capture system 100 and the depth camera 115b.

Figure 9C:
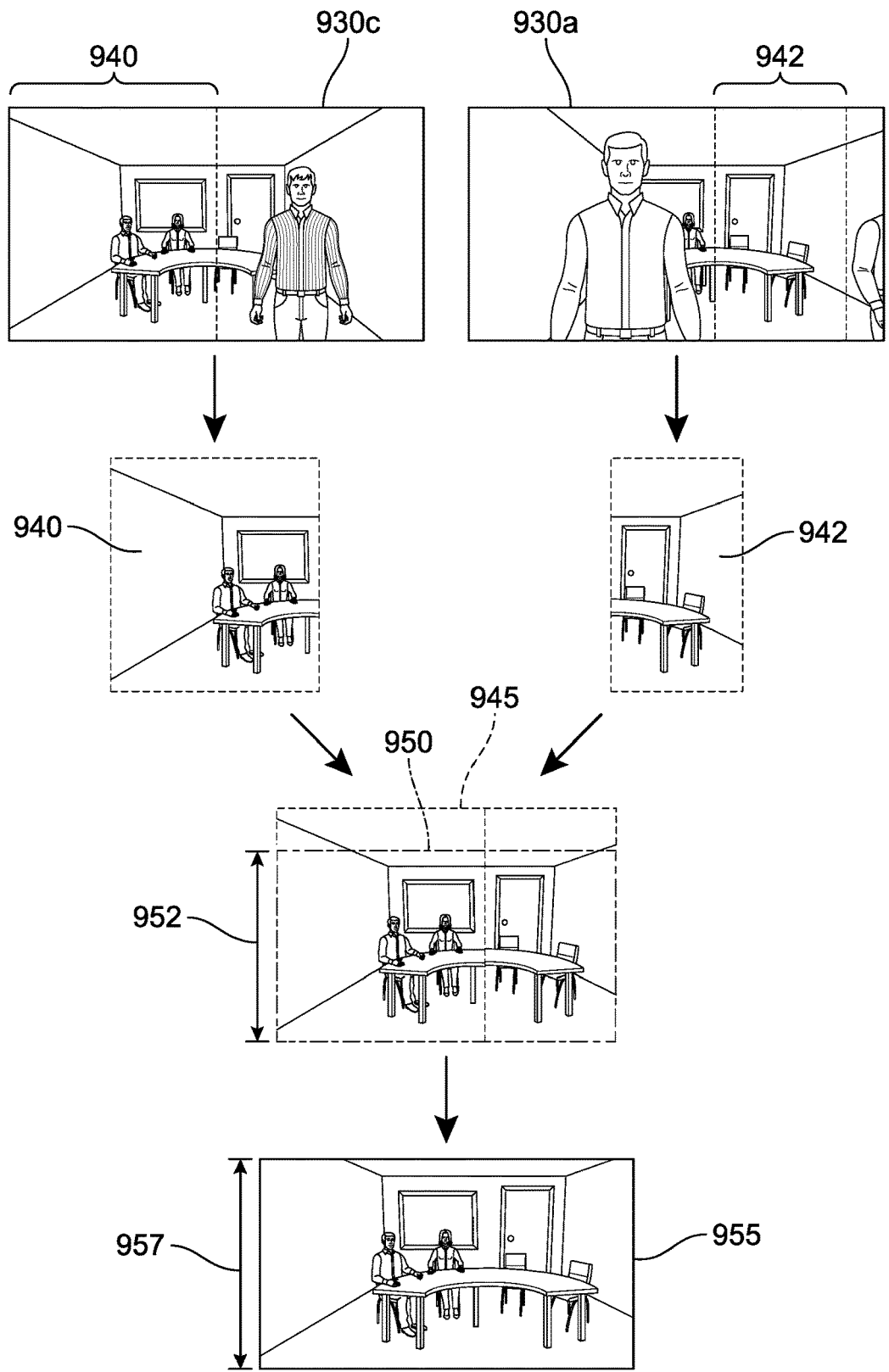
FIG. 9C illustrates an example in which two background cameras are selected, and portions of RGB images captured by the selected background cameras are stitched to produce a background image.

FIG. 9C illustrates an example in which two background cameras are selected, and portions of RGB images captured by the selected background cameras are stitched to produce a background image 955. In this example, two of the RBG cameras 110 have been selected as the background cameras, and the RGB images 930a and 930c captured by the selected background cameras have been obtained. A portion 940 of the RGB image 930c and a portion 942 of the RGB image 930a are selected (for example, based on the portions 940 and 942 not being occluded) and are stitched together into a stitched image 945. A portion 950 of the stitched image, with a height 952 and a desired aspect ratio for the background image 955, is then scaled to the height 957 to generate the background image 955.

Figure 9D:
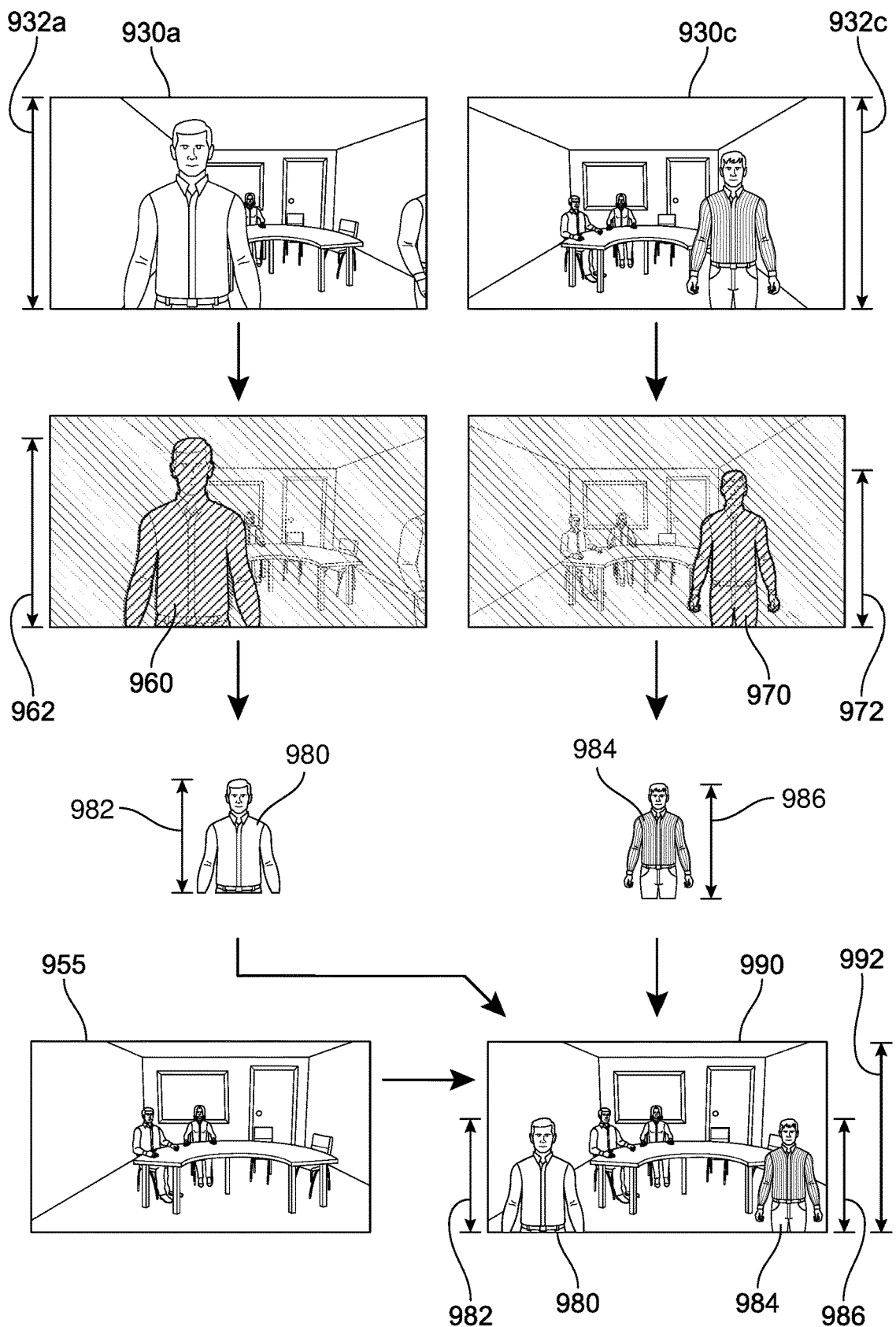
FIG. 9D illustrates an example in which two respective foreground images are generated for two foreground subjects, and a composite image is generated from the two foreground images and the background image generated in FIG. 9C.

FIG. 9D illustrates an example in which two respective foreground images 980 and 984 are generated for two foreground subjects, and a composite image 990 is generated from the two foreground images 980 and 984 and the background image 955 generated in FIG. 9C. The RGB camera 110a is selected as the foreground camera for the participant 132 and the RGB camera 110c is selected as the foreground camera for the participant 134. The corresponding RGB images 930a and 930c (with respective heights 932a and 932c) are retrieved, foreground portions 960 and 970 (with respective heights 962 and 972) are segmented as previously described, and foreground images 980 and 984 (with respective heights 982 and 986) are generated from the foreground portions 960 and 970. The two foreground images 980 and 984 are then composited with the background image 955 from FIG. 9C to generate a composite image 990 for the scene 900.

Figure 10:
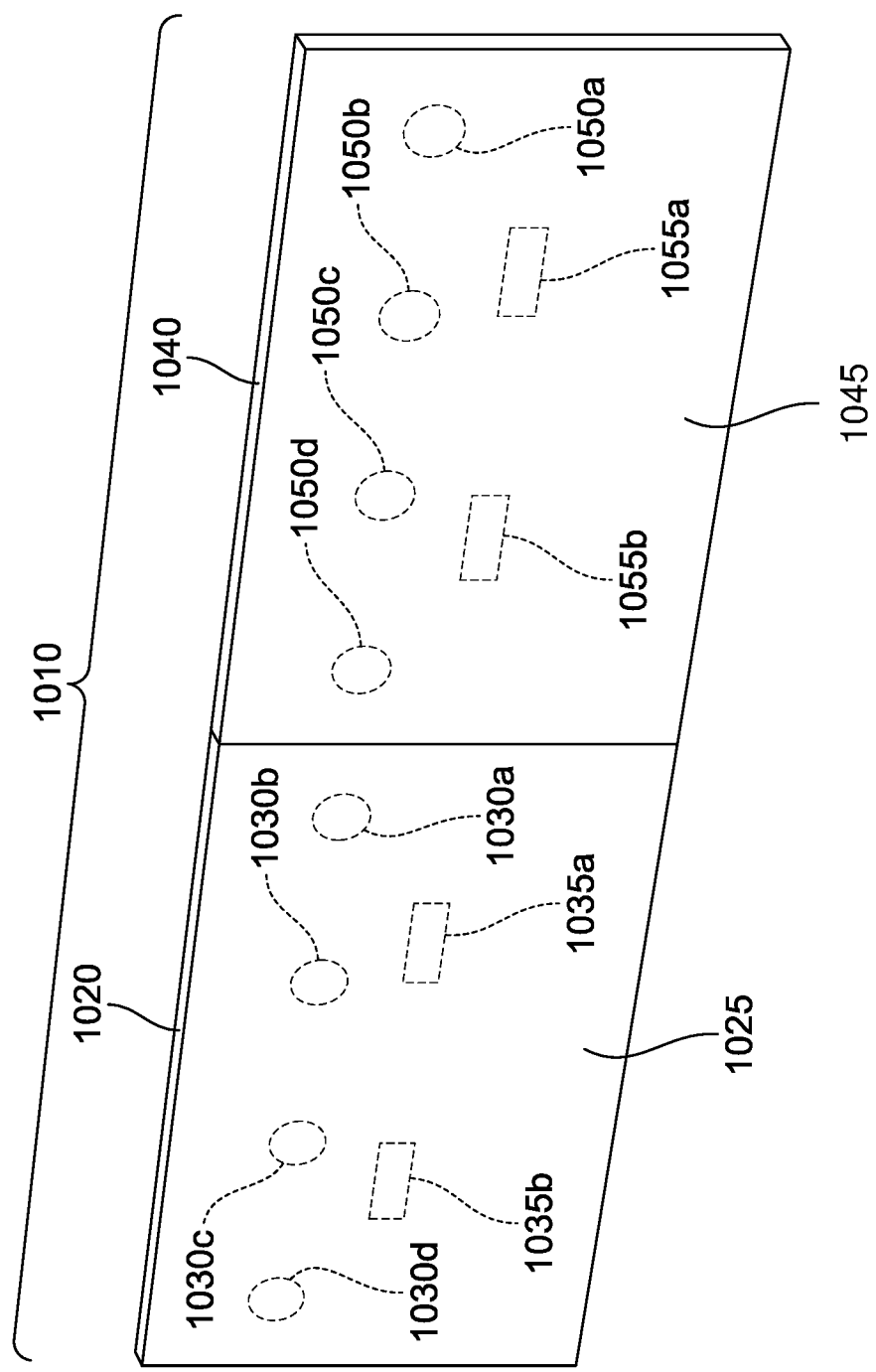
FIG. 10 illustrates an example in which two video capture systems are tile adjacent to each other to provide a larger video capture system.

FIG. 10 illustrates an example in which two video capture systems 1020 and 1040 are tiled adjacent to each other to provide a larger video capture system 1010. First and second video capture systems 1020 and 1040 are positioned in landscape orientations and horizontally adjacent to each other. The two video capture systems 1020 and 1040 are communicatively coupled to operate together as a single larger video capture system 1010, which is configured to make use of the RGB cameras 1030a, 1030b, 1030c, 1030d, 1050a, 1050b, 1050c, and 1050d, and the depth cameras 1035a, 1035b, 1055a, and 1055b, arranged behind display screens 1025 and 1045. The individual video capture systems 1020 and 1040, as well as the larger video capture system 1010, may include the various features described herein for video capture systems. Other numbers, orientations, and arrangements of multiple systems may be used, such as, but not limited to, multiple systems positioned in portrait orientations and horizontally to each other, and arrays of systems (for example, a 2×2 array). Such arrangements offer more cameras, and a wider FOV. Additionally, multiprocessing may be performed among multiple video capture systems.

Figure 11:
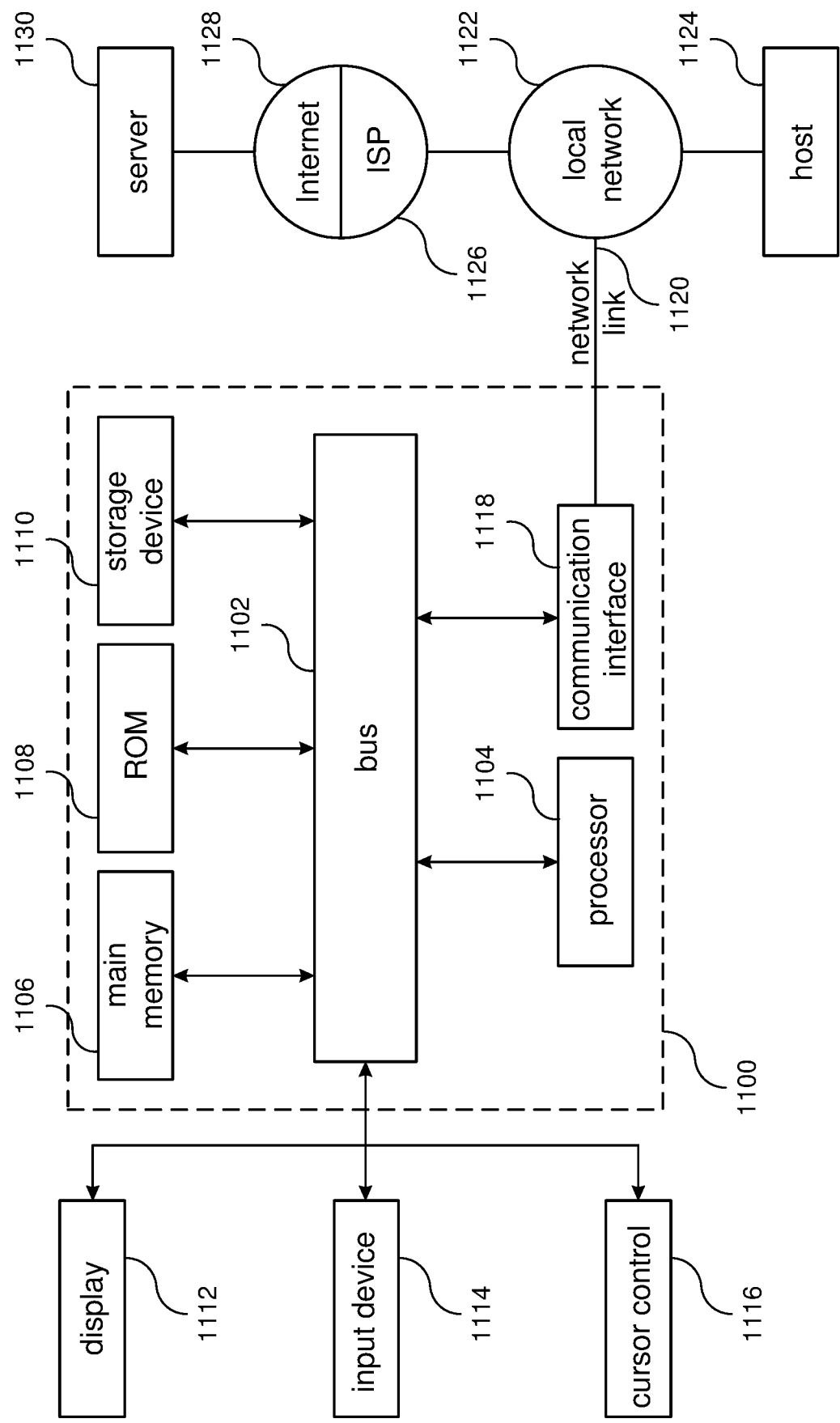
FIG. 11 illustrates a block diagram showing an example computer system upon which aspects of this disclosure may be implemented.

FIG. 11 illustrates a block diagram showing an example computer system 1100 upon which aspects of this disclosure may be implemented. Computer system 1100 includes a bus 1102 or other communication mechanism for communicating information, and a processor 1104 coupled with bus 1102 for processing information. Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. The computer system 1100 can implement, for example, one or more of, or portions of video capture systems 100 and 300, remote display systems 160 and 380, and/or external services 375.

Computer system 1100 can further include a read only memory (ROM) 1108 or other static storage device coupled to bus 1102 for storing static information and instructions for processor 1104. A storage device 1110, such as a flash or other non-volatile memory can be coupled to bus 1102 for storing information and instructions.

Computer system 1100 may be coupled via bus 1102 to a display 1112, such as a liquid crystal display (LCD), for displaying information. One or more user input devices, such as the example user input device 1114 can be coupled to bus 1102, and can be configured for receiving various user inputs, such as user command selections and communicating these to processor 1104, or to a main memory 1106. The user input device 1114 can include physical structure, or virtual implementation, or both, providing user input modes or options, for controlling, for example, a cursor, visible to a user through display 1112 or through other techniques, and such modes or operations can include, for example virtual mouse, trackball, or cursor direction keys.

The computer system 1100 can include respective resources of processor 1104 executing, in an overlapping or interleaved manner, respective program instructions. Instructions may be read into main memory 1106 from another machine-readable medium, such as storage device 1110. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media can include, for example, optical or magnetic disks, such as storage device 1110. Transmission media can include optical paths, or electrical or acoustic signal propagation paths, and can include acoustic or light waves, such as those generated during radio-wave and infrared data communications, that are capable of carrying instructions detectable by a physical mechanism for input to a machine.

Computer system 1100 can also include a communication interface 1118 coupled to bus 1102, for two-way data communication coupling to a network link 1120 connected to a local network 1122. Network link 1120 can provide data communication through one or more networks to other data devices. For example, network link 1120 may provide a connection through local network 1122 to a host computer 1124 or to data equipment operated by an Internet Service Provider (ISP) 1126 to access through the Internet 1128 a server 1130, for example, to obtain code for an application program.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A video capture system comprising:
   a foreground segmenter configured to receive a first RGB image captured by a first camera located at a first geographic location and identify a first foreground portion of the first RGB image, the first foreground portion corresponding to a first subject, wherein a total height of the first foreground portion is a first percentage of a total height of the first RGB image;
   a foreground image generator configured to generate a first foreground image by resizing the first foreground portion of the first RGB image; and
   an image compositor configured to composite the first foreground image with a first background image to produce a first composite image, wherein a total height of the first foreground image in the first composite image is a second percentage of a total height of the first composite image and the second percentage is substantially less than the first percentage,
   wherein the video capture system is configured to cause the first composite image to be displayed at a second geographic location different than the first geographic location.

2. The system of claim 1, further comprising a display screen, wherein the first camera is positioned to capture RGB images through the display screen.

3. The system of claim 1, further comprising:
   a background camera selector configured to select one of a plurality of cameras located at the first geographic location as a first background camera, wherein the first background camera is different than the first camera; and
   a background image generator configured to receive a second RGB image captured by the first background camera and generate the first background image based on at least the second RGB image.

4. The system of claim 3, wherein:
   the background camera selector is further configured to select one of the plurality of cameras as a second background camera; and
   the background image generator is further configured to receive a third RGB image captured by the second background camera and generate the first background image by stitching together a portion of the second RGB image and a portion of the third RGB image.

5. The system of claim 3, further comprising a display screen, wherein:
   the plurality of cameras includes the first camera;
   each of the plurality of cameras is positioned to capture RGB images through the display screen; and
   each of the plurality of cameras is positioned at about a first distance from a lateral midline of the display screen in a first direction perpendicular to the lateral midline of the display screen.

6. The system of claim 1, wherein the foreground image generator or the image compositor is further configured to perform an alpha blending or blur along an edge of the first image.

7. The system of claim 1, wherein:
   the foreground segmenter is further configured to receive a second RGB image captured by a second camera at the first geographic location and identify a second foreground portion of the second RGB image, the second foreground portion corresponding to a second subject, wherein a total height of the second foreground portion is a third percentage of a total height of the second RGB image;
   the foreground image generator is further configured to generate a second foreground image by resizing the second foreground portion of the second RGB image; and
   the image compositor is configured to composite the first foreground image and the second foreground image with the first background image to produce the first composite image, wherein a total height of the second foreground image in the first composite image is a fourth percentage of a total height of the first composite image and the fourth percentage is substantially less than the third percentage.

8. The system of claim 1, further comprising:
   an image encoder configured to receive a series of composite images, including the first composite image, from the image compositor, and output an encoded video stream from the series of composite images, the video stream including the first composite image; and
   a video conferencing module configured to participate in a video conferencing session, receive the encoded video stream from the image encoder, and transmit the encoded video stream to a system serving as an endpoint of the video conferencing session at the second geographic location.

9. The system of claim 1, wherein the foreground segmenter is further configured to identify positions in the first RGB image that correspond to depth estimates of the first subject, and identify the first foreground portion of the first RGB image based on at least the identified positions.

10. A method comprising:
    obtaining a first RGB image captured by a first camera located at a first geographic location;
    identifying a first foreground portion of the first RGB image corresponding to a first subject, wherein a total height of the first foreground portion is a first percentage of a total height of the first RGB image;
    generating a first foreground image by resizing the first foreground portion of the first RGB image;
    compositing the first foreground image with a first background image to produce a first composite image, wherein a total height of the first foreground image in the first composite image is a second percentage of a total height of the first composite image and the second percentage is substantially less than the first percentage; and causing the first composite image to be displayed at a second geographic location different than the first geographic location.

11. The method of claim 10, wherein:

the first camera is included in a first plurality of cameras located at the first geographic location; and the method further comprises:

determining a position of the first subject in relation to the plurality of cameras, and selecting a first camera from the plurality of cameras for the obtaining the first RGB image based on at least the determined position.

12. The method of claim 10, wherein the first camera is positioned to capture RGB images through a display screen.

13. The method of claim 10, further comprising:

selecting a first background camera from a plurality of cameras located at the first geographic location, wherein the first background camera is different than the first camera;

obtaining a second RGB image captured by the first background camera; and generating the first background image from at least a portion of the second RGB image.

14. The method of claim 13, further comprising:

selecting a second background camera from the plurality of cameras;

obtaining a third RGB image captured by the second background camera; and generating the first background image by stitching together a portion of the second RGB image and a portion of the third RGB image.

15. The method of claim 13, wherein the first camera is positioned at a first height, and the first background camera is positioned at a second height that is less than or about the same as the first height.

16. The method of claim 10, wherein the compositing the first foreground image with the first background image includes performing an alpha blending or blur along an edge of the first image.

17. The method of claim 10, further including:

obtaining a second RGB image captured by a second camera located at the first geographic location;

identifying a second foreground portion of the second RGB image, the second foreground portion corresponding to a second subject, wherein a total height of first foreground portion is a third percentage of a total height of the second RGB image; and generating a second foreground image by resizing the second foreground portion of the second RGB image, wherein the compositing the first foreground image with the first background image is performed by compositing the first foreground image and the second foreground image with the first background image to produce the first composite image, wherein a total height of the second foreground image in the first composite image is a fourth percentage of the total height of the first composite image and the fourth percentage is substantially less than the third percentage.

18. The method of claim 10, wherein the first RGB image is captured for a video conferencing session; and the method further comprises:

encoding a video stream including the first composite image, and transmitting the encoded video stream to a system serving as an endpoint of the video conferencing session at the second geographic location.

19. The method of claim 10, further comprising:

obtaining depth estimates of the first subject for approximately a same time as when the first RGB image is captured by the first camera;

identifying positions in the first RGB image that correspond to the depth estimates, wherein the segmenting the first RGB image to identify the first foreground portion is based on at least the identified positions.

20. A nontransitory computer readable medium including instructions recorded thereon which, when executed by one or more processors, cause the processors to perform the method of claim 10.

* * * * *